(12) United States Patent
Korup

(10) Patent No.: US 11,805,891 B2
(45) Date of Patent: Nov. 7, 2023

(54) UNIT AND MULTI DOSE APPLICATORS AND METHODS OF USE

(71) Applicant: Young Microbrush, LLC, Grafton, WI (US)

(72) Inventor: Todd Korup, Port Washington, WI (US)

(73) Assignee: Young Microbrush, LLC, Grafton, WI (US)

( * ) Notice: Subject to any disclaimer, the term of this patent is extended or adjusted under 35 U.S.C. 154(b) by 733 days.

(21) Appl. No.: 16/533,680

(22) Filed: Aug. 6, 2019

(65) Prior Publication Data
US 2020/0037743 A1    Feb. 6, 2020

Related U.S. Application Data

(60) Provisional application No. 62/715,089, filed on Aug. 6, 2018, provisional application No. 62/715,102, filed on Aug. 6, 2018, provisional application No. 62/715,095, filed on Aug. 6, 2018.

(51) Int. Cl.
*A46B 11/00* (2006.01)
*A61C 3/00* (2006.01)

(52) U.S. Cl.
CPC ...... *A46B 11/0003* (2013.01); *A46B 11/0006* (2013.01); *A46B 11/0075* (2013.01); *A61C 3/005* (2013.01); *A46B 11/0041* (2013.01); *A46B 2200/10* (2013.01); *A46B 2200/20* (2013.01)

(58) Field of Classification Search
CPC ............ A46B 11/0003; A46B 11/0075; A46B 11/0006; A46B 2200/10; A46B 2200/20; A46B 11/00; A46B 11/0041; A46B 11/0072; A46B 2200/1066; A61C 3/005; A61C 3/00; A61M 35/00; A61M 35/0006
USPC .................................................. 401/132–134
See application file for complete search history.

(56) References Cited

U.S. PATENT DOCUMENTS

| | | | | |
|---|---|---|---|---|
| 4,049,354 A | * | 9/1977 | O'Rourke | A46B 11/0041 401/184 |
| 6,059,570 A | * | 5/2000 | Dragan | A61C 5/50 433/80 |
| 6,238,120 B1 | * | 5/2001 | Mark | A61C 5/62 401/265 |

(Continued)

*Primary Examiner* — David J Walczak
(74) *Attorney, Agent, or Firm* — McDermott Will & Emery LLP

(57) ABSTRACT

A dental application device having a handle having a first end, a second end, and a containment chamber disposed within the handle. The device has a dental solution disposed within the containment chamber, a receiver tip coupled to the handle at the first end, a material passage within the receiver tip that forms a conduit between the first end and a receiving end, a frangible seal that separates the containment chamber from the material passage, and a piercing cannula in fluid communication with an applicator tip and having a distal piercing end extending toward the frangible seal. The piercing cannula is moveable between a first position and a second position. When in the first position, the piercing end is spaced apart from the frangible seal, and in the second position, the piercing end punctures the frangible seal and fluidly connects the dental solution with the applicator tip.

5 Claims, 17 Drawing Sheets

(56) References Cited

U.S. PATENT DOCUMENTS

| | | | | |
|---|---|---|---|---|
| 6,505,985 B1* | 1/2003 | Hidle | ............... | A61M 35/003 604/3 |
| 6,679,642 B1* | 1/2004 | Dillingham | ........ | A46B 11/0041 401/184 |
| 2007/0201939 A1* | 8/2007 | Wong | ............... | A46B 11/0041 401/262 |

* cited by examiner

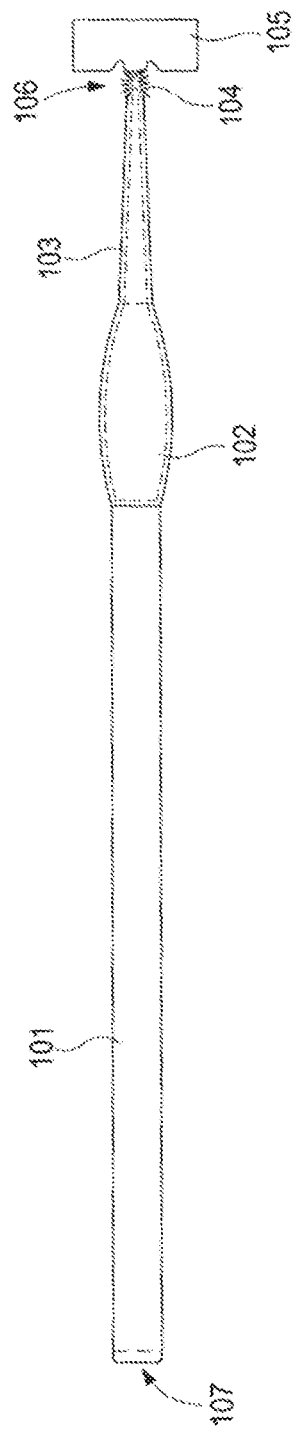
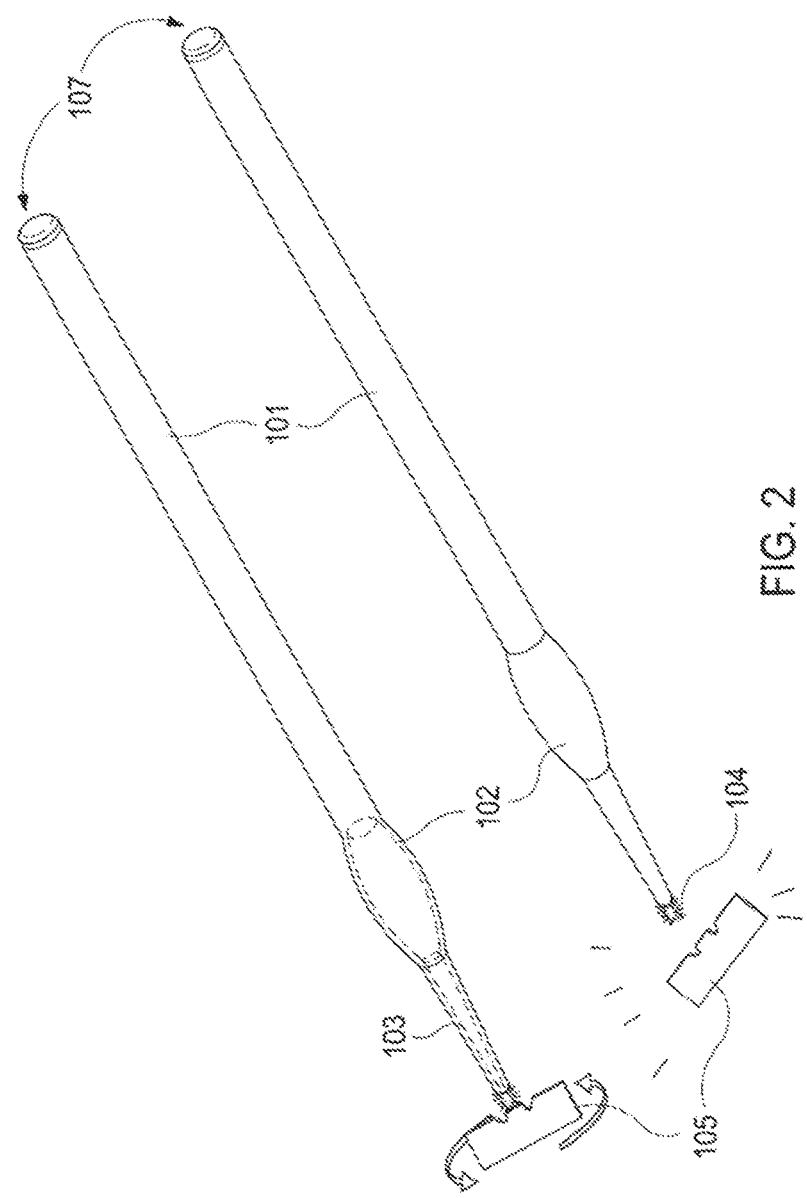
FIG. 1
FIG. 2

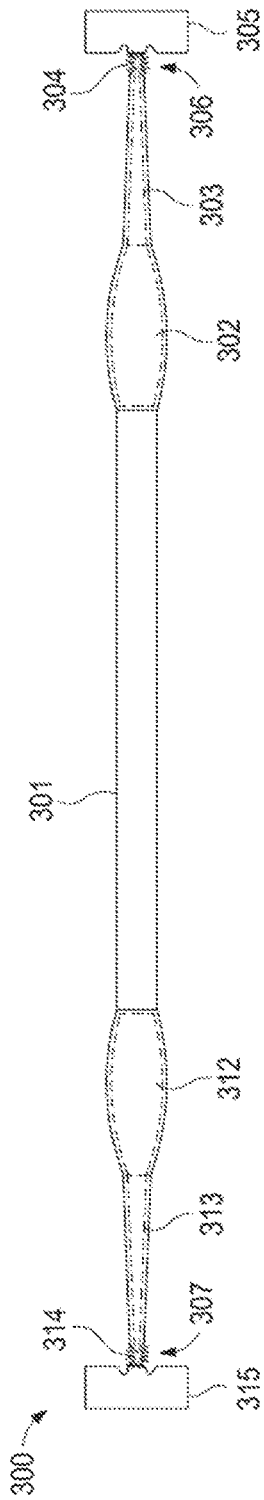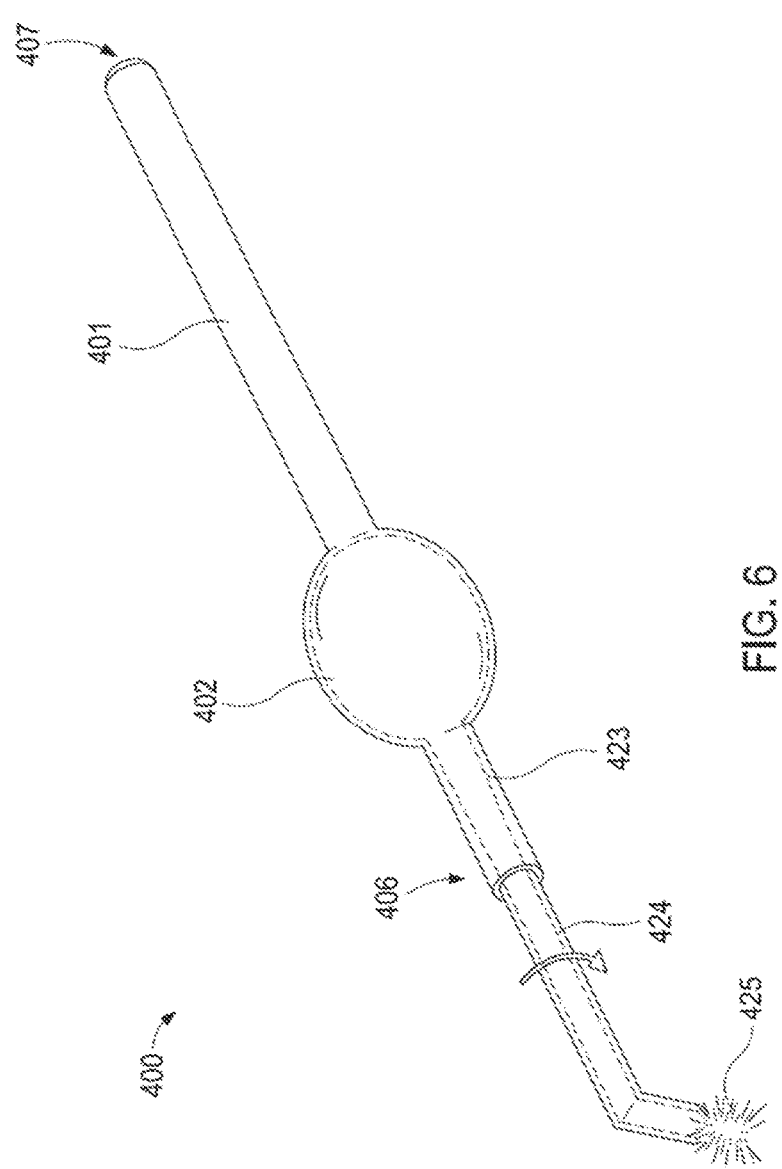

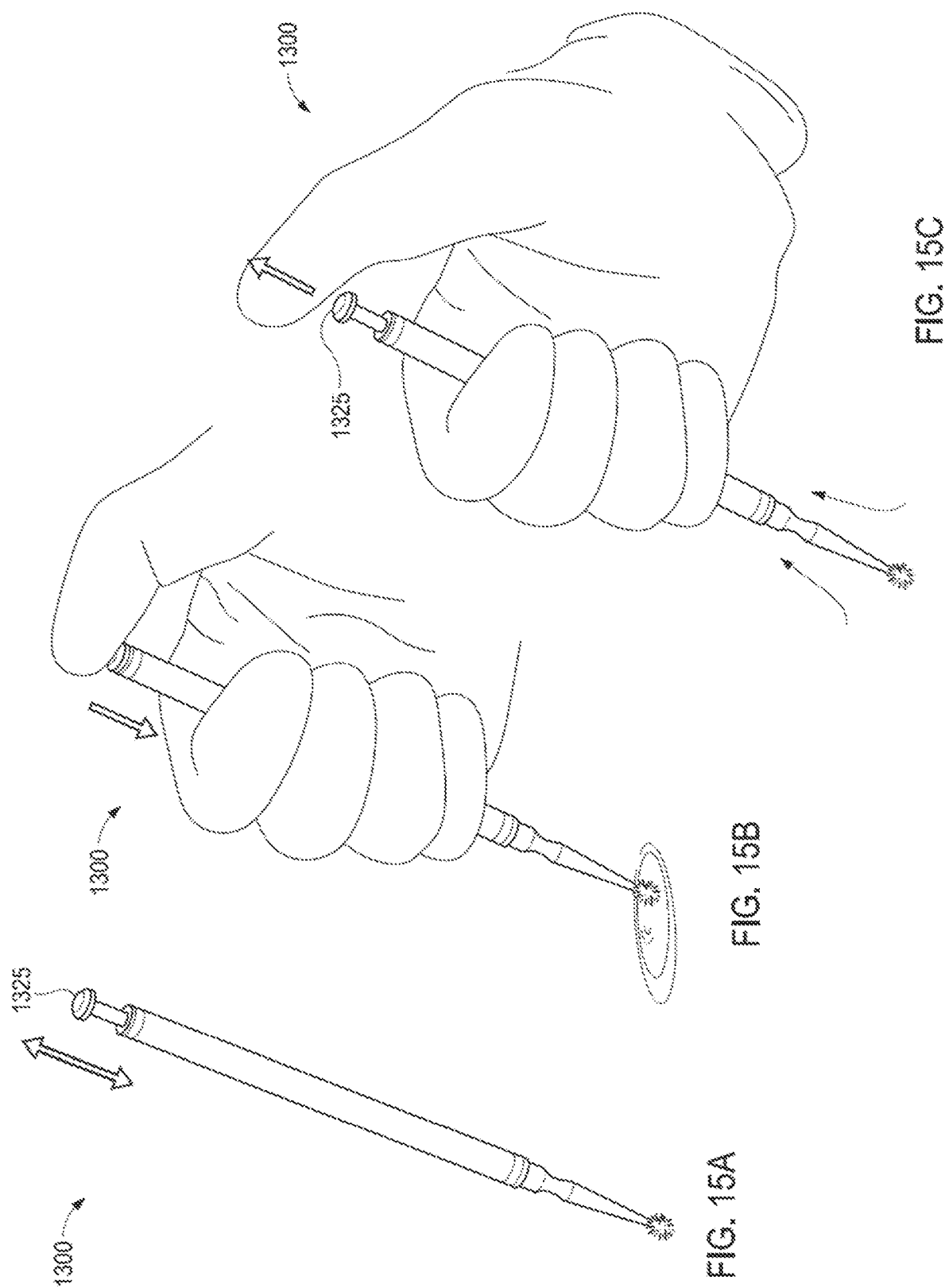

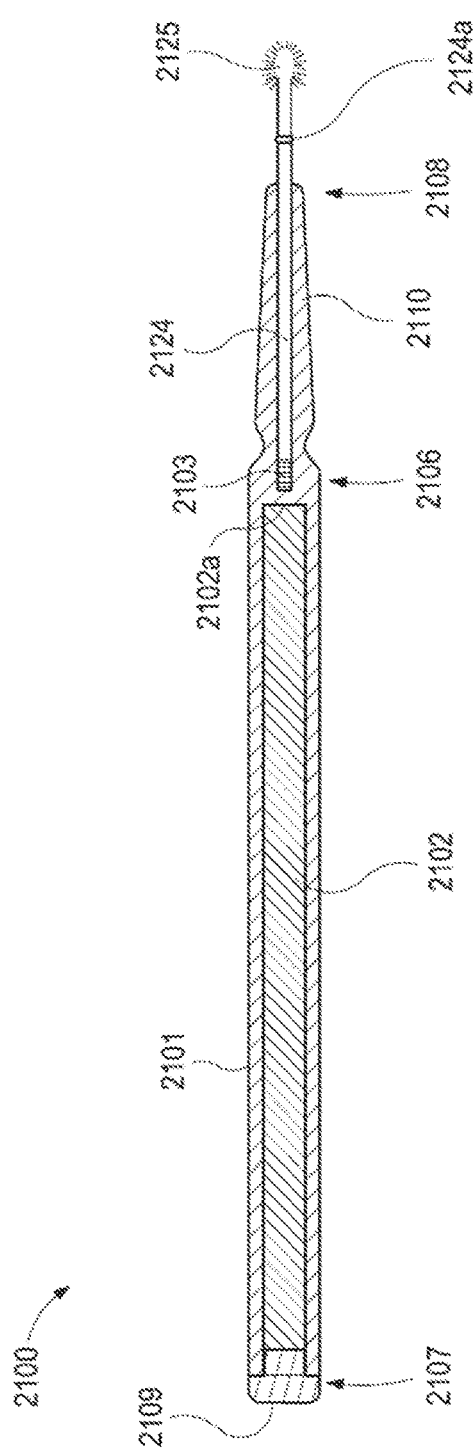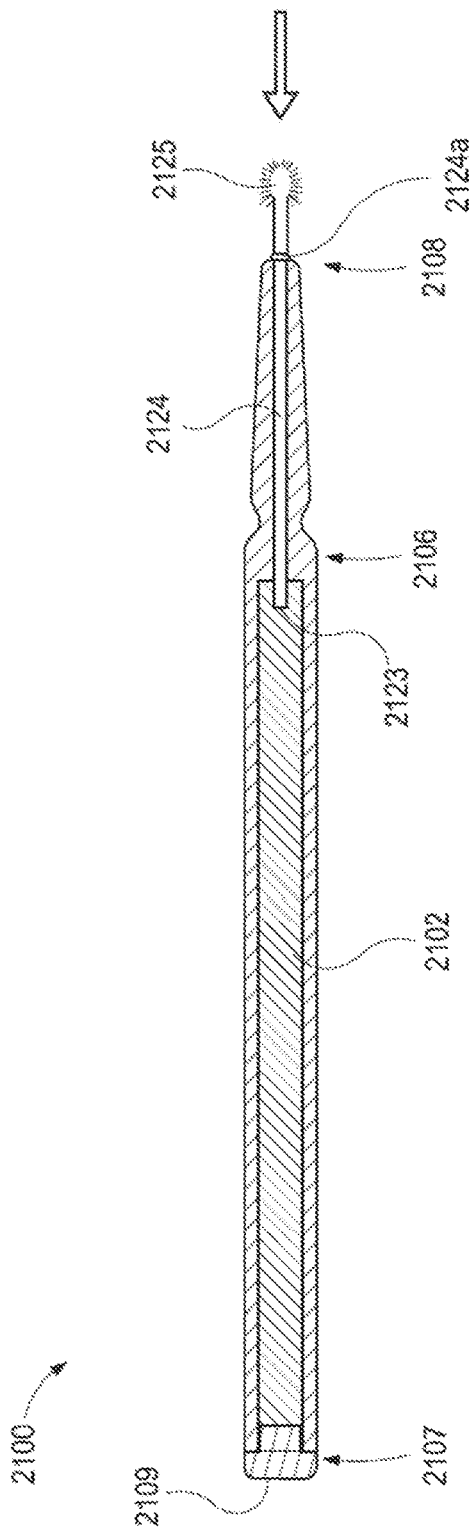

UNIT AND MULTI DOSE APPLICATORS AND METHODS OF USE

CROSS-REFERENCE TO RELATED APPLICATIONS

The present application claims the benefit of priority under 35 U.S.C. § 119 from U.S. Provisional Patent Application Ser. No. 62/715,089 entitled "UNIT DOSE APPLICATOR AND METHODS OF USE," filed on Aug. 6, 2018, U.S. Provisional Patent Application Ser. No. 62/715,095 entitled "MULTI DOSE APPLICATOR AND METHODS OF USE," filed on Aug. 6, 2018, and U.S. Provisional Patent Application Ser. No. 62/715,102 entitled "UNIT DOSE APPLICATOR WITH CONTAINMENT CHAMBER AND METHODS OF USE," filed on Aug. 6, 2018, the disclosures of which are hereby incorporated by reference in their entirety for all purposes.

TECHNICAL FIELD

The present disclosure relates to a dental application device, in particular, single and multi-dose dental application devices having a containment chamber with a predetermined amount of dental solution.

BACKGROUND

In the field of dentistry, various dental medicaments, sealants, bonding agents, etchants, cavity liners, and disclosing solutions are applied to the teeth of a patient as part of routine dental cleaning, preparation, and restorative procedures. During dental restorative procedures, for example, a bonding agent may be applied to teeth prior to application of a dental composite. One method of applying bonding agent to teeth is to dip a tip of the dental application device into a well containing the bonding agent and subsequently brush the bonding agent over the subject tooth of the patient. Such a dental application device, however, does not allow for sufficient control of the amount of solution retained by the tip of the dental application device prior to delivery to the patient. In addition, after the bonding agent from the tip is applied to the patient, the user must pause the procedure to again dip the tip of the dental application device into the well before continuing. This causes delays in the procedure, creates irregularities in application, and interrupts the workflow of the dentist or technician.

SUMMARY OF THE INVENTION

In some implementations of the present disclosure, a dental application device is provided having a handle with a first end, a second end, and a containment chamber disposed within the handle. The containment chamber has a dental solution disposed within the chamber. The device also has a first applicator tip coupled to the handle at the first end, a material passage disposed within the handle that forms a conduit between the containment chamber and the first applicator tip, and a frangible seal disposed within the material passage that separates the containment chamber from the applicator tip. Removing the frangible seal allows the dental solution to flow from the containment chamber to the applicator tip. In some embodiments, the applicator tip is comprised of an orientation of fibers or bristles. In other embodiments, the second fluid is a dental solution. In some embodiments, the second applicator tip may be coupled to the handle at a second end. In this embodiment, the second applicator tip may be fluidly coupled to a second containment chamber. Additionally, the first applicator tip may be made of an orientation of fibers and the second applicator tip may be made of a plurality of bristles.

In other implementations of the present disclosure, a dental applicator is provided having a handle having a first end, a second end, and a containment chamber disposed within the handle. The applicator also has a first applicator tip coupled to the handle at the first end and a material passage that fluidly couples the containment chamber to the first applicator tip. Deforming at least a portion of the containment chamber displaces a first fluid within the containment chamber and subsequently releasing the containment chamber creates a suction action, allowing a second fluid to be drawn into the containment chamber through the first applicator tip. In some embodiments, the applicator tip is comprised of an orientation of fibers or bristles. In other embodiments, the second fluid is a dental solution. In some embodiments, the second applicator tip may be coupled to the handle at a second end. In this embodiment, the second applicator tip may be fluidly coupled to a second containment chamber. Additionally, the first applicator tip may be made of an orientation of fibers and the second applicator tip may be made of a plurality of bristles.

In other implementations of the present disclosure, a dental applicator is provided having a handle having a first end, a second end, and a containment chamber disposed within the handle. The applicator also contains an applicator tip coupled to the handle at the first end, a material passage that fluidly couples the containment chamber to the applicator tip, a through hole connected between the containment chamber and the second end, a plunger receivably coupled to the handle via the through hole, the plunger having a plunger first end and a plunger second end, a button disposed at the plunger second end, a seal coupled to the plunger at the plunger first end, a spring disposed between the button and the second end of the handle. Pressing the button displaces a first fluid within the containment chamber and subsequently releasing the button creates a suction action, allowing a second fluid to be drawn into the containment chamber. In some embodiments, the applicator tip is comprised of an orientation of fibers or bristles. In some embodiments, the second fluid is a dental solution.

In other implementations of the present disclosure, a dental application device is provided having a handle having a first end, a second end, and a containment chamber disposed within the handle. The device also has a dental solution disposed within the containment chamber, a receiver tip coupled to the handle at the first end, a material passage disposed within the receiver tip that forms a conduit between the first end and a receiving end, a frangible seal that separates the containment chamber from the material passage, and a piercing cannula in fluid communication with an applicator tip and having a distal piercing end, said piercing end extending toward said frangible seal. The piercing cannula is moveable between a first position and a second position. When in the first position, the piercing end is spaced apart from the frangible seal, and in the second position, the piercing end punctures the frangible seal and fluidly connects the dental solution with the applicator tip. In some embodiments, the applicator tip is comprised of an orientation of fibers or bristles. In some embodiments, the piercing cannula contains a cannula stop. Additional embodiments may contain an activator cap coupled to the receiver tip.

In other implementations of the present disclosure, a dental application device is provided having a handle having a first end, a second end, and a containment chamber disposed within the handle. The device additionally contains a dental solution disposed within the containment chamber, a tip assembly having a piercing end and an applicator tip, a material passage disposed within the tip assembly that forms a conduit between the piercing end and the applicator tip, and a frangible seal that separates the containment chamber from the material passage. When the tip assembly is coupled to the first end of the handle, the piercing end punctures the frangible seal and fluidly connects the dental solution with the applicator tip.

BRIEF DESCRIPTION OF THE DRAWINGS

The present disclosure will now be described by way of example, with reference to the accompanying drawings in which implementations of the disclosures are illustrated and, together with the descriptions below, serve to explain the principles of the disclosure. The accompanying figures are included to provide further understanding and are incorporated in and constitute a part of this specification. The accompanying figures disclose implementations that, together with the description, serve to explain principles of the disclosed implementations.

FIG. 1 is a side view of an exemplary unit dose dental application device.

FIG. 2 is an isometric view of an exemplary unit dose dental application device.

FIG. 5 is a side view of an exemplary two-piece unit dose dental application device.

FIG. 6 is an isometric view of an exemplary unit dose dental application device.

FIGS. 15A, 15B, and 15C are isometric views of an exemplary double-sided multi dose dental application device in use.

FIG. 16 is a cross-sectional side view of an alternate exemplary unit dose dental application device.

FIG. 17 is a cross-sectional side view of an alternate exemplary unit dose dental application device that is activated.

DETAILED DESCRIPTION

Figure 3:
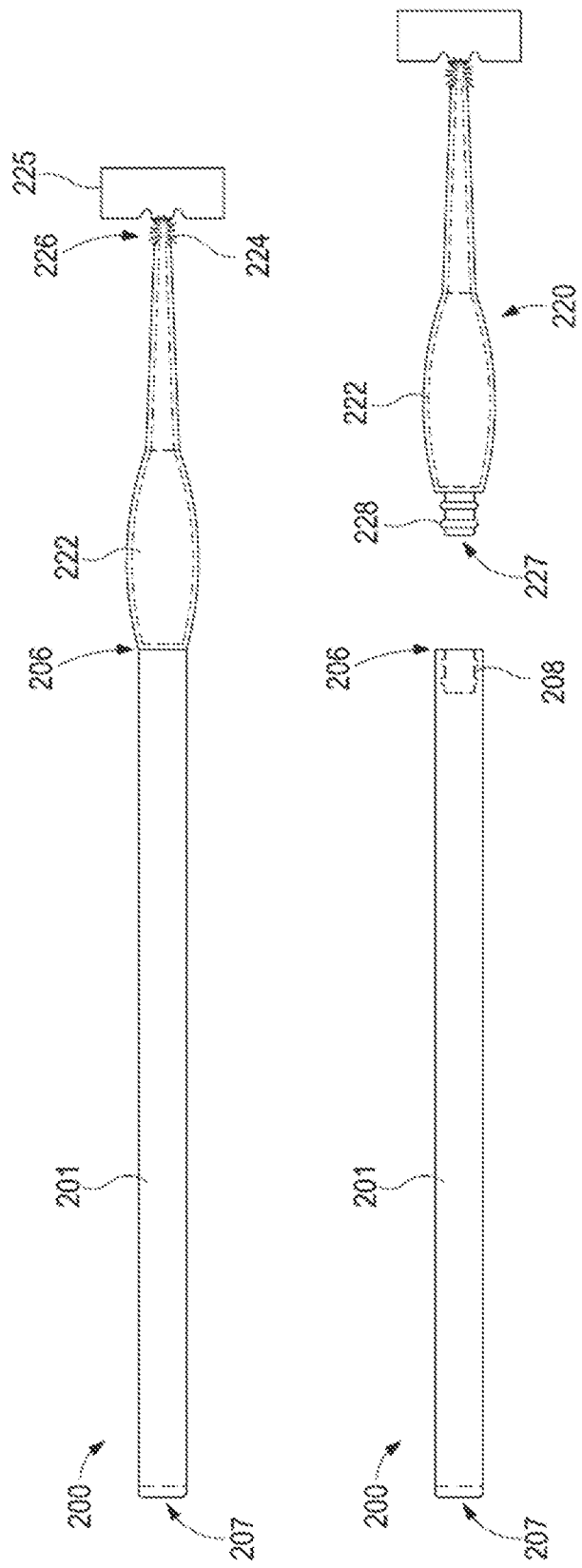
FIG. 3 is a side view of an exemplary two-piece unit dose dental application device.

The present disclosure relates to tools used in the field of dentistry and, more particularly, to unit and multi-dose dental application devices used to deliver dental solutions to a tooth surface.

Unit Dose Applicator

Referring to FIG. 1, illustrated is a side view of an exemplary unit dose dental application device 100, according to one or more embodiments of the present disclosure. As discussed herein, the unit dose dental application device 100 may be particularly useful in containing, dispensing, and applying a dental solution. Dental solutions that may be used with the unit dose dental application device 100 may be any flowable dental medicaments, sealants, bonding agents, etchants, cavity liners, or disclosing solutions that are commonly applied to teeth during dental cleaning, preparation, and restorative processes. Exemplary dental solutions that may be used in conjunction with the unit dose dental application device 100 include, but are not limited to, fluoride varnish, flowable composites, whitening solutions and gels, cements, adhesives, bonding agents, desensitizers, and etchants.

As illustrated, the unit dose dental application device 100 may include a generally elongated handle 101 having a first end 106 and a second end 107. The unit dose dental application device 100 may also have a containment chamber 102 disposed within the handle 101 for storing a dental solution. The handle 101 may be made of plastic, such as polypropylene, but could equally be made of any other rigid, semi-rigid, or elastic material (e.g., a metal, a composite material, an elastomer, etc.), without departing from the scope of the disclosure. An applicator tip 104 may be coupled to the handle 101 at the first end 106. A material passage 103 connects the containment chamber 102 to the applicator tip 104 creating a path through which the dental solution can travel. A frangible seal 105 is coupled to the material passage 103 at the first end 106. The frangible seal 105 separates the dental solution from the atmosphere. Acting on, activating, or in some manner removing the frangible seal 105, opens the passage 103 allowing the contained dental solution to travel to the first end 106 where it can exit the unit dose dental application device 100.

The containment chamber 102 is designed with, and manufactured from, materials that provide a chemically stable environment for the dental solution until which time the frangible seal 105 is acted upon, exposing the dental solution to the atmosphere and ultimately its intended use. The containment chamber 102 also acts as a "bulb," wherein squeezing the containment chamber 102 encourages the dental solution to travel through the passage 103 to the first end 106 of the unit dose dental application device 100.

Applicator tip 104 may be comprised of an orientation of fibers (commonly referred to as flocking), affixed to the handle 101 at the first end 106, which hold in suspension at least a quantity of the dental solution and which helps spread and distribute the dental solution to the work area. The applicator tip 104 may be used to apply dental solution directly to the teeth of a patient. The applicator tip 104 may be formed through known flocking methods, such as electrostatic flocking or gravity flocking.

In some embodiments, both the applicator tip 104 and the frangible seal 105 may be have an orientation of fibers applied through known flocking methods. In such an embodiment, there is no need to prevent flocking material from entering material passage 103 as it is covered by frangible seal 105. Removing and discarding the frangible seal 105 from the first end 106 opens the passage 103 and leaves only the flocking material applied to the applicator tip 104.

In some embodiments, however, the applicator tip 104 may comprise a plurality of bristles. The bristles may be made of or otherwise constitute reasonably soft fibers or filaments so as not to irritate target dental surfaces. Both natural and synthetic fibers or filaments may be used to form the bristles. Suitable natural fibers include, but are not limited to, cotton fibers, celluloses, gums, carbopolymers, water-dispersible polymers, and any combination thereof. Suitable synthetic fibers can include, but are not limited to, nylon, polyesters, polyamides, polyolefins, polypropylenes, polyvinylpyrrolidone, and any combination thereof. In addition, various injection moldable plastics may be formed as the bristles using standard injection molding techniques, without departing from the scope of the disclosure.

Referring now to FIG. 2, with continued reference to FIG. 1, illustrated is an isometric view of an exemplary embodiment of the unit dose dental application device 100, according to one or more embodiments. As illustrated, the material passage 103 extends within the handle 101 between the containment chamber 102 to the applicator tip 104 at the first end 106. The frangible seal 105 separates the dental solution from the atmosphere and the applicator tip 104. Acting on, activating, or in some manner removing the frangible seal 105, opens the passage 103 and thereby allows the dental solution to flow out of the material passage 103 and onto the applicator tip 104. In an exemplary embodiment, the frangible seal 105 is a twist-off type seal whereby a user may apply a torsion force to remove the frangible seal 105 allowing the contained dental solution to travel to the first end 106 where it can exit the unit dose dental application device 100. In other embodiments, the frangible seal 105 may be be a snap-off type seal, a puncture-type seal, or any other well-known frangible seal type without departing from the scope of the disclosure. The frangible seal 105 may also be located at any point between the containment chamber 102 and the applicator tip 104 without departing from the scope of the disclosure.

In exemplary operation, a user may activate the unit dose dental application device 100 by applying a torsion force to the frangible seal 105 thereby separating it from the first end 106 and thereby opening the passage 103. As the user applies pressure to the containment chamber 102, dental solution is forced through passage 103 toward first end 106 where it is then held in suspension by applicator tip 104. The user may then apply the dental solution to the teeth of a patient as part of routine dental cleaning, preparation or restorative procedures. The user may again apply pressure to the containment chamber 102 to supply additional dental solution to applicator tip 104 once more dental solution is needed, thereby reducing interruptions during the dental procedure adding convenience for the user. In particular, the user may easily reapply dental solution to the applicator tip 104 without removing the applicator from the mouth of a patient. In addition, by varying the pressure applied to the containment chamber 102, the user may precisely control the amount of dental solution supplied to the applicator tip 104.

The applicator 100 may be made of any elastic material including, but not limited to, plastics, polymers, elastomers, rubber, nitrile, silicone, urethane, chloroprene, Ethylene Vinyl Acetate, or any combination thereof. The diameter or size of the applicator 100 may vary, depending primarily on the configuration of the applicator (e.g., the size of the material passage 103) and the type of dental solution being applied with the applicator tip 104. For instance, a larger size material passage 103 may be preferred and employed in order to convey higher viscosity dental solutions. A larger material passage 103 may also allow a dental solution to be applied at an increased flow rate. A larger material passage 103, a larger containment chamber 102, or a combination of both may be preferred when using a larger applicator tip 104 or when a particular dental procedure requires a larger amount of dental solution. As will be appreciated, the applicator 100 may be designed and otherwise manufactured to meet any desired size and application constraints. Exemplary sizes for the material passage 103 may range from about 15 gauge to about 25 gauge. In at least one embodiment, the size of the material passage 103 may range between about 18 gauge to about 20 gauge.

FIG. 3 is a side view of another embodiment of a two-piece unit dose dental application device 200, according to one or more embodiments. This embodiment depicts a unit dose dental application device 200 designed to contain, then dispense and apply a predetermined amount of solution. The device is intended as a single use device, commonly referred to as a "unit dose." The two-piece unit dose dental application device 200 combines a molded plastic handle portion 201 with a separate plastic blow-fill-mold constructed tip assembly 220 having a containment chamber 222 disposed therein. The tip assembly 220 also includes a twist-off cap or frangible seal 225. The combination of these items into a single device uses known manufacturing methods to solve manufacturing, as well as functionality, challenges associated with unit dose devices.

As illustrated, two-piece unit dose dental application device 200 may include a generally elongated handle 201 having a first end 206 and a second end 207. The unit dose dental application device 200 may also have a containment chamber 222 disposed within a tip assembly 220 for storing a dental solution. The handle 201 may be made of plastic, such as polypropylene, but could equally be made of any other rigid or semi-rigid material (e.g., a metal, a composite material, etc.), without departing from the scope of the disclosure. The tip assembly 220 has a first end 226 and a second end 227. The tip assembly 220 also includes circular protrusions 228 at second end 227 that are designed to matingly couple with circular valleys 208 at first end 206. The tip assembly 220 may be coupled to the handle 201 at first end 206 and second end 227 via circular protrusions 228 and circular valleys 208.

Figure 4:
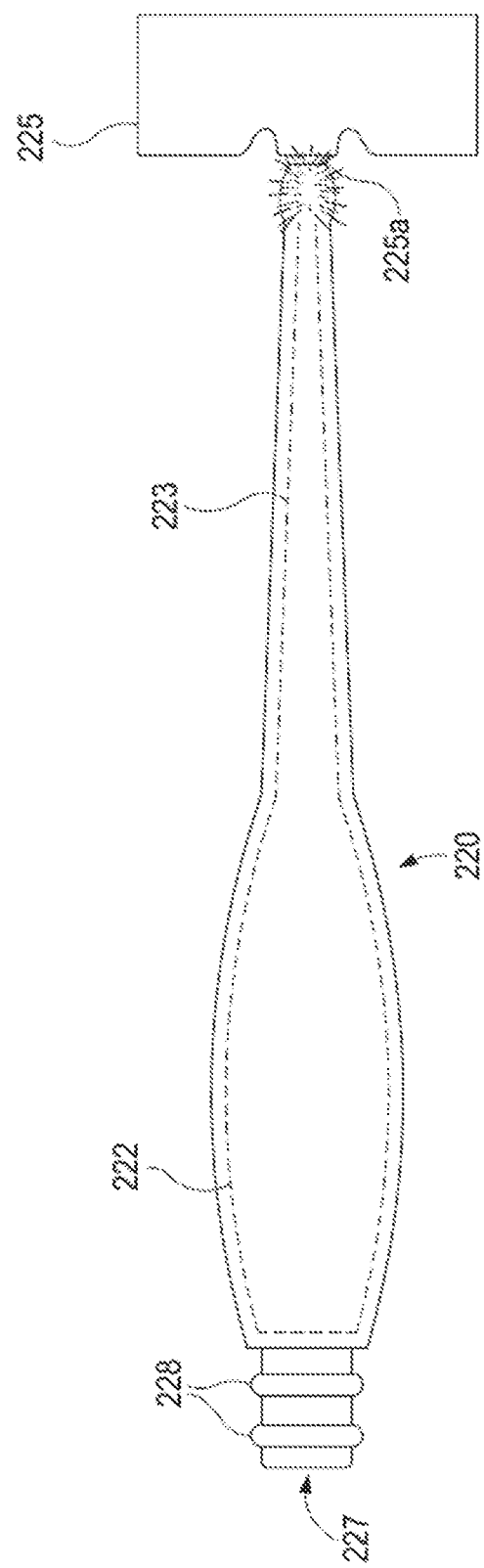
FIG. 4 is a side view of an exemplary tip assembly for a two-piece unit dose dental application device.

FIG. 4 is a side view of tip assembly 220. An applicator tip 224 may be coupled to the tip assembly 220 at the first end 226. A material passage 223 connects the containment chamber 222 to the applicator tip 224 creating a path through which the dental solution can travel. A frangible seal 225 is coupled to the material passage 223 at the first end 226. The frangible seal 225 separates the dental solution from the atmosphere. Acting on, activating, rotating, or in some manner removing the frangible seal 225 causes controlled separation of the frangible seal 225 via a score feature 225a and opens the passage 223 allowing the contained dental solution to travel to the first end 226 where it can exit the unit dose dental application device 200. The frangible seal 225 may also be implemented in any similar manner described with respect to frangible seal 105 described in the first embodiment.

In some embodiments, tip assembly 220 may be coupled to the handle 201 using an interference fit or a threaded interface between the outer radial surface of the first end 227 and the second end 206. In other embodiments, the tip assembly 220 may be secured to the handle 201 using an adhesive or epoxy, through sonic welding techniques, spin welding, or a one-way snap fit without departing from the scope of the disclosure.

The tip assembly 220 may be made of any elastic material including, but not limited to, plastics, polymers, elastomers, rubber, nitrile, silicone, urethane, chloroprene, Ethylene Vinyl Acetate, or any combination thereof. The diameter or size of the containment chamber 222 may vary, depending primarily on the configuration of the tip assembly 220 (e.g., the size of the material passage 223) and the type of dental solution being applied with the applicator tip 224. For instance, a larger size material passage 223 may be preferred and employed in order to convey higher viscosity dental solutions. A larger material passage 223 may also allow a dental solution to be applied at an increased flow rate. A larger material passage 223, a larger containment chamber 220, or a combination of both may be preferred when using a larger applicator tip 224 or when a particular dental procedure requires a larger amount of dental solution. As will be appreciated, the tip assembly 220 may be designed and otherwise manufactured to meet any desired size and application constraints. Exemplary sizes for the material passage 223 may range from about 15 gauge to about 25 gauge. In at least one embodiment, the size of the material passage 223 may range between about 18 gauge to about 20 gauge.

FIG. 5 is a side view of another embodiment of a double-sided unit dose dental application device 300, according to one or more embodiments. This embodiment depicts a unit dose dental application device designed to contain, then dispense and apply a predetermined amount of two solutions. The device is intended as a single use device, commonly referred to as a "unit dose." Specifically the double-sided unit dose dental application device 300 has a unit dose applicator on each side of the device, effectively doubling its capacity allowing the user to use two different dental solutions, or twice the amount of a chosen dental solution.

As illustrated, the double-sided unit dose dental application device 300 may include a generally elongated handle 301 having a first end 306 and a second end 307. The double-sided unit dose dental application device 300 may also have first and second containment chambers 302 and 312 disposed within the handle 301 for storing dental solutions. The handle 301 may be made of plastic, such as polypropylene, but could equally be made of any other rigid, semi-rigid, or elastic material (e.g., a metal, a composite material, elastomer, etc.), without departing from the scope of the disclosure. A first applicator tip 304 may be coupled to the handle 301 at the first end 306. A second applicator tip 314 may be coupled to the handle 301 at the second end 307. A first material passage 303 connects the containment chamber 302 to the applicator tip 304 creating a path through which a first dental solution can travel. A second material passage 313 connects the containment chamber 312 to the second applicator tip 314 creating a path through which a second dental solution can travel. Frangible seals 305 and 315 are coupled to the material passage 303 at the first end 306 and material passage 313 at the second end 307. The frangible seals 305 and 315 separate the dental solution from the atmosphere. Acting on, activating, or in some manner removing the frangible seal 305 or 315, opens the passage 303 or 313 allowing the contained dental solution to travel to the first end 306 or second end 307 respectively where it can exit the double-sided unit dose dental application device 300.

The double-sided unit dose dental application device 300 described herein can be readily adapted to include separate tip assemblies from the handle. In some embodiments, the tip assemblies may be coupled to the handle via circular protrusions and circular valleys, an interference fit, using an adhesive or epoxy, through sonic welding techniques, spin welding, a one-way snap fit, or with a threaded connection without departing from the scope of the disclosure.

FIG. 6 is an isometric view of another embodiment of a unit dose dental application device 400, according to one or more embodiments. This embodiment depicts a unit dose dental application device 400 designed to contain, then dispense and apply a predetermined amount of solution. The device is intended as a single use device, commonly referred to as a "unit dose." The unit dose dental application device 400 may include a generally elongated handle 401 having a first end 406 and a second end 407. The unit dose dental application device 400 may also have a containment chamber 402 disposed within the handle 401 for storing a dental solution. The handle 401 may be made of plastic, such as polypropylene, but could equally be made of any other rigid, semi-rigid, or elastic material (e.g., a metal, a composite material, an elastomer, etc.), without departing from the scope of the disclosure. A turning tip 424 may be coupled to the handle 401 at the first end 406. A material passage 423 connects the containment chamber 402 to an applicator tip 425 creating a path through which the dental solution can travel. A frangible seal is coupled to the material passage 423 at the first end 406. The frangible seal separates the dental solution from the atmosphere. Acting on, activating, or in some manner removing the frangible seal opens the passage 423 allowing the contained dental solution to travel to the applicator tip 425 where it can exit the unit dose dental application device 400.

The material passage 423 extends within the turning tip 424 between the containment chamber 402 to the applicator tip 425. The frangible seal separates the dental solution from the atmosphere and the applicator tip 425. Acting on, activating, or in some manner removing the frangible seal, opens the passage 423 and thereby places the containment chamber 402 in fluid communication with the applicator tip 425 during operation. In an exemplary embodiment, turning tip 424 is rotatable with respect to the handle 402 and the frangible seal is a twist-off type seal. A user may apply a torsion force to turning tip 424 and break the frangible seal allowing the contained dental solution to travel to the applicator tip 425. In other embodiments, the frangible seal may be be a snap-off type seal, a puncture-type seal, or any other well-known frangible seal type without departing from the scope of the disclosure. The frangible seal may also be located at any point between the containment chamber 402 and the applicator tip 425 without departing from the scope of the disclosure.

In an alternative embodiment, the material passage 423 may be misaligned with an opening in containment chamber 402 when the turning tip 424 is in a first position, thereby separating the dental solution from the atmosphere and the applicator tip 425. A user may rotate turning tip 424 to a second position and align the material passage 423 with an opening in containment chamber 402, allowing the contained dental solution to travel to the applicator tip 425.

The containment chamber 402 is designed with, and manufactured from, materials that provide a chemically stable environment for the dental solution until which time the frangible seal is acted upon, exposing the dental solution to the atmosphere and ultimately its intended use. The containment chamber 402 also acts as a "bulb," wherein squeezing the containment chamber 402 encourages the dental solution to travel through the passage 423 to the applicator tip 425.

In some embodiments, the containment chamber 402 is constructed of both rigid and elastic materials. In such embodiments, only a portion of the containment chamber 402 is compressible, thereby allowing the user greater control over the amount of dental solution supplied to the applicator tip 425.

In other embodiments, the containment chamber may include a first vessel and a second vessel, each vessel containing a mixable dental solution. A first conduit connects the first vessel to the applicator tip creating a path through which the first mixable dental solution can travel. A second conduit connects the second vessel to the applicator tip creating a path through which the second mixable dental solution can travel. A frangible seal is coupled to the material passages at the first end. The frangible seal separates the dental solution from the atmosphere and the applicator tip. Acting on, activating, or in some manner removing the frangible seal, opens the passages, thereby placing the first and second vessels in fluid communication with the applicator tip during operation. In an exemplary embodiment, a turning tip is rotatable with respect to the handle and the frangible seal is a twist-off type seal. A user may apply a torsion force to the turning tip and break the frangible seal allowing the contained mixable dental solutions to travel to the applicator tip. Once the first and second mixable dental solutions are mixed at applicator tip, they combine to form a mixed dental solution which may be applied to a work surface. In other embodiments, the frangible seal may be be a snap-off type seal, a puncture-type seal, or any other well-known frangible seal type without departing from the scope of the disclosure. The frangible seal may also be located at any point between the containment chamber and the applicator tip without departing from the scope of the disclosure.

Applicator tip 425 may be comprised of an orientation of fibers (commonly referred to as flocking) which hold in suspension and help spread and distribute the dental solution to the work area. The applicator tip 425 may be used to apply dental solution directly to the teeth of a patient. The applicator tip 425 may be formed through known flocking methods, such as electrostatic flocking or gravity flocking.

In some embodiments, however, the applicator tip 425 may comprise a plurality of bristles. The bristles may be made of or otherwise constitute reasonably soft fibers or filaments so as not to irritate target dental surfaces. Both natural and synthetic fibers or filaments may be used to form the bristles. Suitable natural fibers include, but are not limited to, cotton fibers, celluloses, gums, carbopolymers, water-dispersible polymers, and any combination thereof. Suitable synthetic fibers can include, but are not limited to, nylon, polyesters, polyamides, polyolefins, polypropylenes, polyvinylpyrrolidone, and any combination thereof. In addition, various injection moldable plastics may be formed as the bristles using standard injection molding techniques, without departing from the scope of the disclosure.

Figure 7:
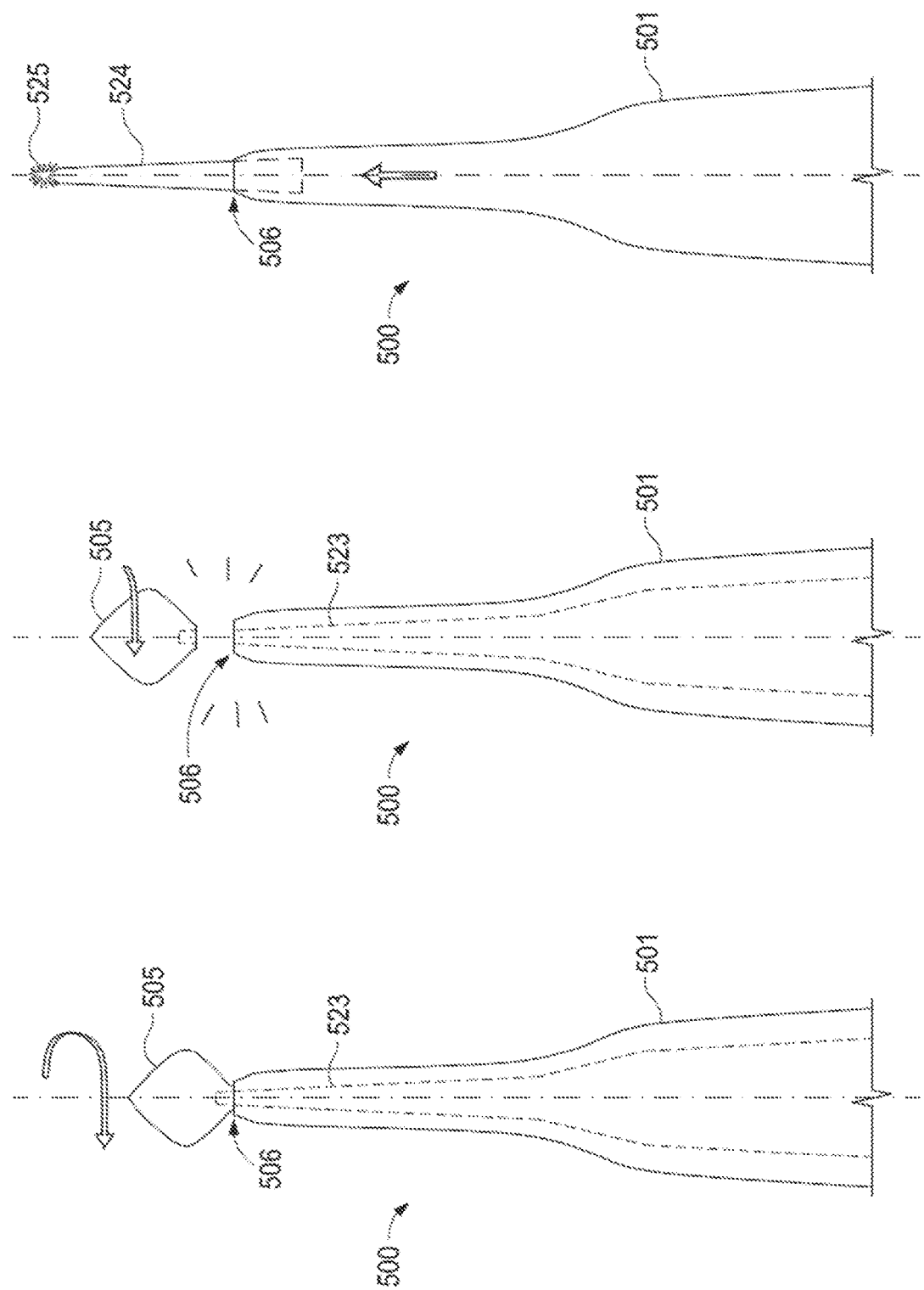
FIG. 7 is a detailed diagram of exemplary methods of manufacture for a unit dose dental application device.

FIG. 7 shows a method of applying a tip 524 to one end 506 of a unit dose dental application device 500. The unit dose dental application device 500 may include a generally elongated handle 501 having a first end 506 and a second end (not shown). The unit dose dental application device 500 may also have a containment chamber (not shown) disposed within the handle 501 for storing a dental solution. A frangible seal 505 is shown which separates the dental solution from the atmosphere. In an exemplary embodiment, the frangible seal 505 is a twist-off type seal whereby a user may apply a torsion force to remove the frangible seal 505 allowing the contained dental solution to travel to the first end 506 where it can exit the unit dose dental application device 500. In other embodiments, the frangible seal 505 may be be a snap-off type seal, a puncture-type seal, or any other well-known frangible seal type without departing from the scope of the disclosure. A tip 524 may be coupled to the handle 501 at the first end 506 after removal of the frangible seal 505. A material passage 523 connects the containment chamber to an applicator tip 525 creating a path through which the dental solution can travel.

Multi-Dose Applicator

As will now be described, an alternate embodiment to the unit dose applicator described above provides for a multi-dose dental application device designed to draw into and momentarily contain and transport to the working area, then dispense and apply an amount of dental solution greater than can be suspended in the applicator tip alone. One benefit of this design is to contain and provide enough dental solution to perform larger applications without the need for the user to return multiple times to the solution, thus saving time and allowing the user to stay focused on the task at hand.

Figure 8:
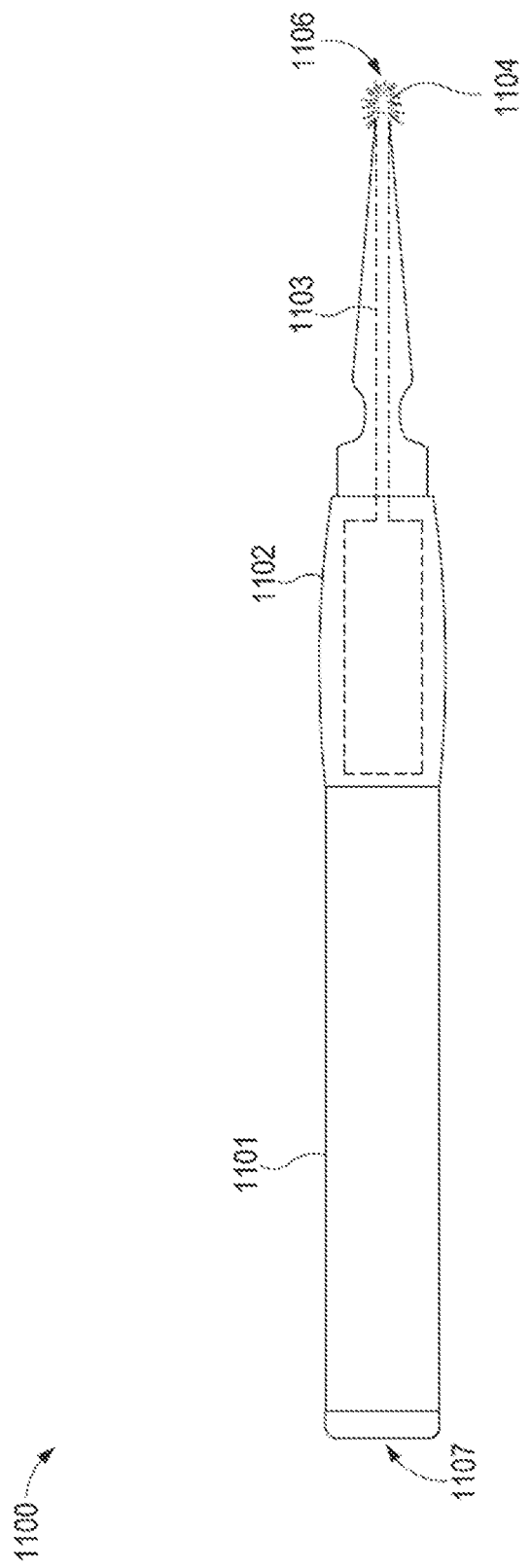
FIG. 8 is a side view of an exemplary multi dose dental application device.

Referring to FIG. 8, illustrated is a side view of an exemplary multi dose dental application device 1100, according to one or more embodiments of the present disclosure. As discussed herein, the multi dose dental application device 1100 may be particularly useful in drawing in, containing, dispensing, and applying a dental solution. Dental solutions that may be used with the multi dose dental application device 1100 may be any flowable dental medicaments, sealants, bonding agents, etchants, cavity liners, or disclosing solutions that are commonly applied to teeth during dental cleaning, preparation, and restorative processes. Exemplary dental solutions that may be used in conjunction with the multi dose dental application device 1100 include, but are not limited to, fluoride varnish, flowable composites, whitening solutions and gels, cements, adhesives, bonding agents, desensitizers, and etchants.

As illustrated, the multi dose dental application device 1100 may include a generally elongated handle 1101 having a first end 1106 and a second end 1107. The multi dose dental application device 1100 may also have a containment chamber 1102 disposed within the handle 1101 for storing a dental solution. The handle 1101 may be made of plastic, such as polypropylene, but could equally be made of any other rigid, semi-rigid, or elastic material (e.g., a metal, a composite material, an elastomer, etc.), without departing from the scope of the disclosure. An applicator tip 1104 may be coupled to the handle 1101 at the first end 1106. A material passage 1103 connects the containment chamber 1102 to the applicator tip 1104 creating a path through which the dental solution can travel.

The containment chamber 1102 is designed from materials allowing enough flexibility to act as a "bulb," wherein deforming and releasing the containment chamber 1102 when the applicator tip 1104 is submerged in the presence of the dental material to be used facilitates drawing up and storing of the dental material into the containment chamber 1102. Subsequent deformation of the containment chamber 1102 encourages the dental material to travel back out through the material passage 1103 to the applicator tip 1104. The containment chamber 1102 is also designed with, and manufactured from, materials that provide a chemically stable environment for the dental solution while it is stored in the containment chamber 1102. The containment chamber 1102 could also be integrated or attached to the handle 1101. The containment chamber 1102 may be made of any elastic or flexible material including, but not limited to, plastics, polymers, elastomers, rubber, nitrile, silicone, urethane, chloroprene, Ethylene Vinyl Acetate, or any combination thereof.

Applicator tip 1104 may be comprised of an orientation of fibers (commonly referred to as flocking), affixed to the handle 1101 at the first end 1106, which hold in suspension and help spread and distribute the dental solution to the work area. The applicator tip 1104 may be used to apply dental solution directly to the teeth of a patient. The applicator tip 1104 may be formed through known flocking methods, such as electrostatic flocking or gravity flocking.

In some embodiments, however, the applicator tip 1104 may comprise a plurality of bristles. The bristles may be made of or otherwise constitute reasonably soft fibers or filaments so as not to irritate target dental surfaces. Both natural and synthetic fibers or filaments may be used to form the bristles. Suitable natural fibers include, but are not limited to, cotton fibers, celluloses, gums, carbopolymers, water-dispersible polymers, and any combination thereof. Suitable synthetic fibers can include, but are not limited to, nylon, polyesters, polyamides, polyolefins, polypropylenes, polyvinylpyrrolidone, and any combination thereof. In addition, various injection moldable plastics may be formed as the bristles using standard injection molding techniques, without departing from the scope of the disclosure.

Figure 9:
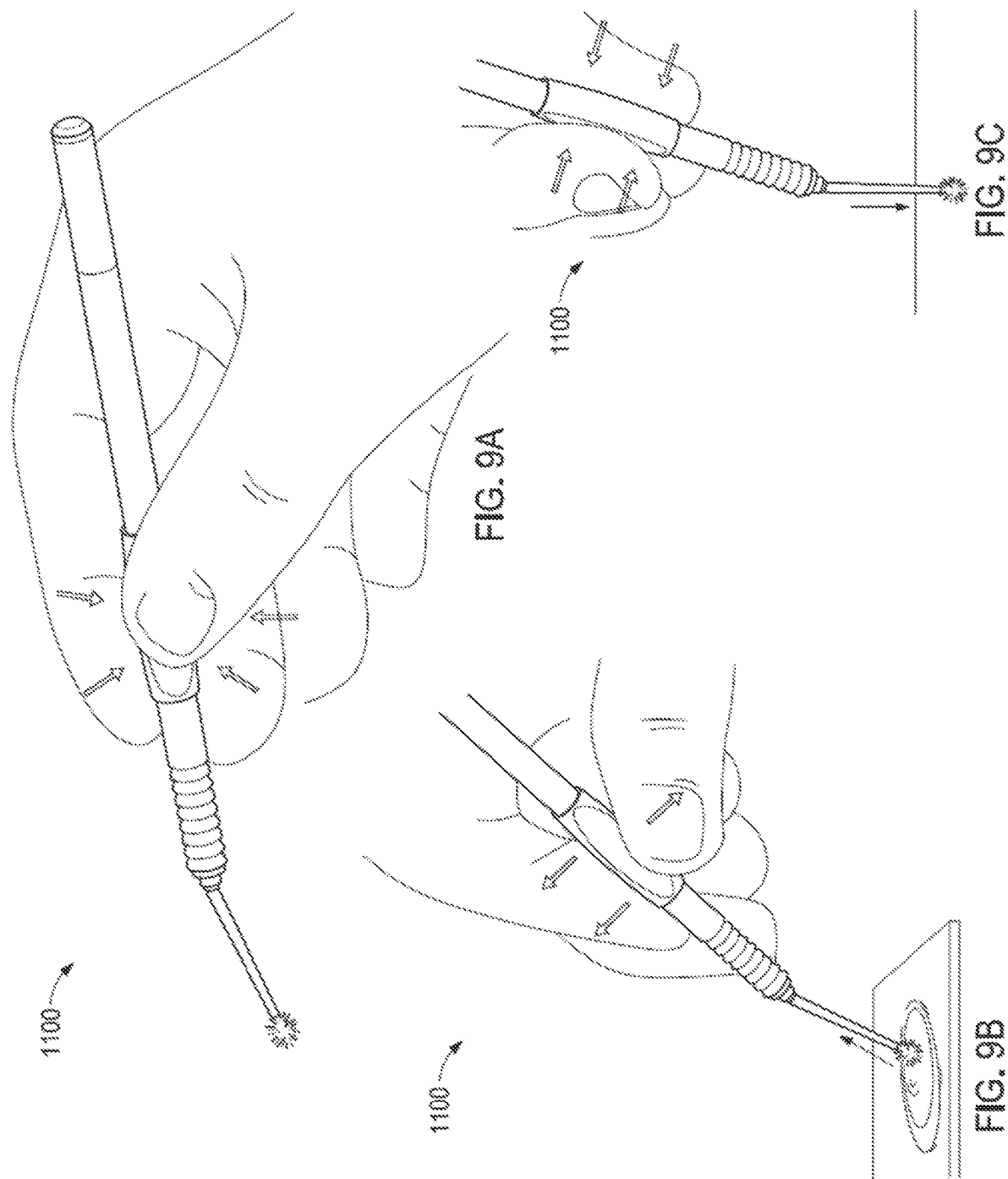
FIGS. 9A, 9B, and 9C are isometric views of an exemplary multi dose dental application device in use.

Referring now to FIGS. 9A, 9B, and 9C, with continued reference to FIG. 8, illustrated is an isometric view of an exemplary embodiment of the multi dose dental application device 1100, according to one or more embodiments. As illustrated, the user deforms the containment chamber 1102, thereby displacing the air contained within. The user then submerges the first end 1106 of the applicator 1100 in the dental solution desired to be used. With the first end 1106 submerged in the dental solution the user then releases their grip on the containment chamber 1102, the result of which creates a suction action which draws dental material up and into the containment chamber 1102 of the applicator. The user then transports the application device 1100 to the work area. As the user applies pressure to the containment chamber 1102, dental solution is forced through passage 1103 toward first end 1106 where it is then held in suspension by applicator tip 1104. The user may then apply the dental solution to the teeth of a patient as part of routine dental cleaning, preparation, and restorative procedures. The user may again apply pressure to the containment chamber 1102 to supply additional dental solution to applicator tip 1104 once more dental solution is needed, thereby reducing interruptions during the dental procedure adding convenience for the user. In addition, by varying the pressure applied to the containment chamber 1102, the user may precisely control the amount of dental solution supplied to the applicator tip 1104.

Figure 10:
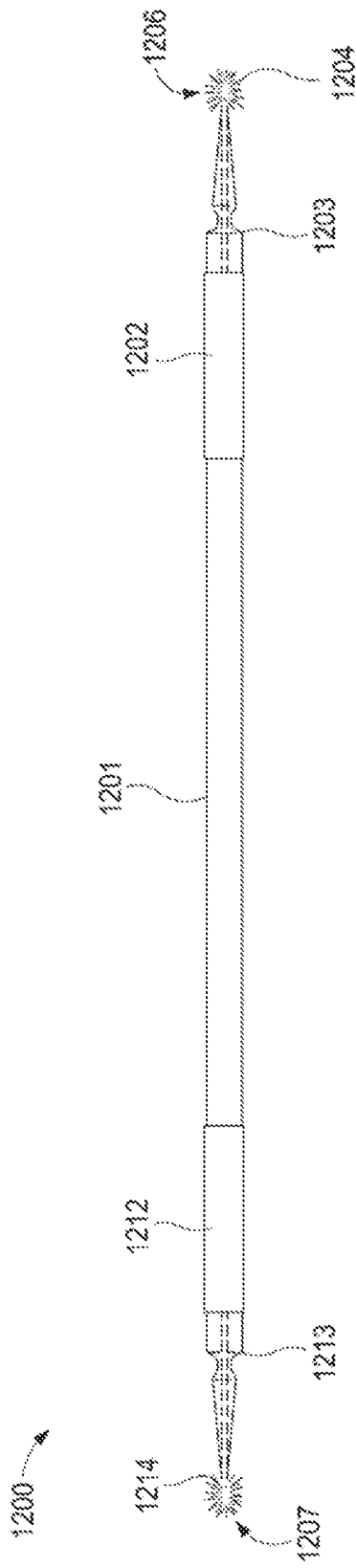
FIG. 10 is a side view of an exemplary double-sided multi dose dental application device.

FIG. 10 is a side view of another embodiment of a double-sided multi dose dental application device 1200, according to one or more embodiments. This embodiment depicts a multi dose dental application device designed to draw in, contain, then dispense and apply a predetermined amount of two solutions. Specifically the double-sided multi dose dental application device 1200 has a multi dose applicator on each side of the device, effectively doubling its capacity allowing the user to use two different dental solutions, or twice the amount of a chosen dental solution.

As illustrated, the double-sided multi dose dental application device 1200 may include a generally elongated handle 1201 having a first end 1206 and a second end 1207. The double-sided multi dose dental application device 1200 may also have first containment chamber 1202 and a second containment chamber 1212 disposed within the handle 1201 for storing dental solutions. The handle 1201 may be made of plastic, such as polypropylene, but could equally be made of any other rigid, semi-rigid, or elastic material (e.g., a metal, a composite material, elastomer, etc.), without departing from the scope of the disclosure. A first applicator tip 1204 may be coupled to the handle 1201 at the first end 1206. A second applicator tip 1214 may be coupled to the handle 1201 at the second end 1207. A first material passage 1203 connects the containment chamber 1202 to the applicator tip 1204 creating a path through which a first dental solution can travel. A second material passage 1213 connects the containment chamber 1212 to the second applicator tip 1214 creating a path through which a second dental solution can travel.

Figure 11:
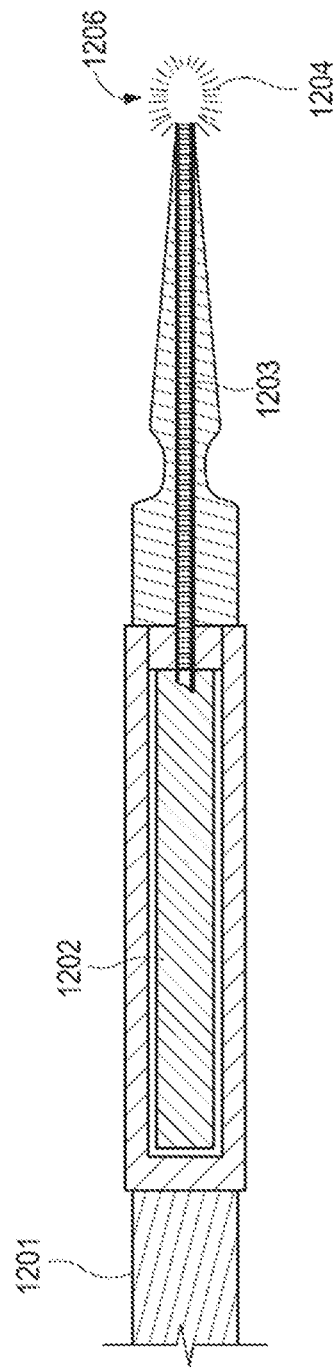
FIG. 11 is a detailed cut away partial side view of an exemplary double-sided multi dose dental application device.
Figure 12:
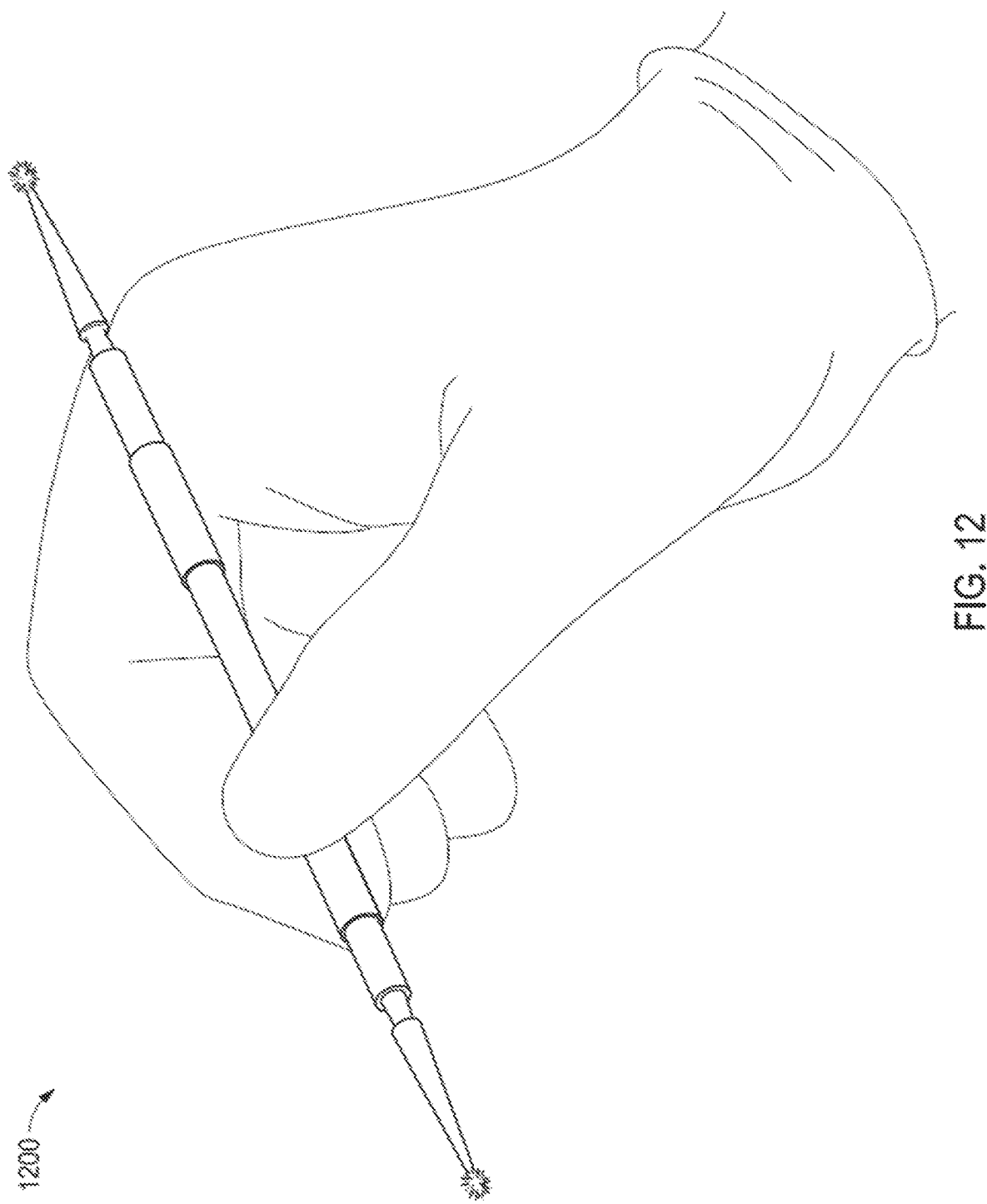
FIG. 12 is an isometric view of an exemplary double-sided multi dose dental application device in use.

Referring now to FIG. 11, with continued reference to FIG. 10, the containment chambers 1202 and 1212 are designed from materials allowing enough flexibility to act as a "bulb," wherein deforming and releasing the containment chambers 1202 or 1212 when the applicator tip 1204 or 1214 are submerged in the presence of the dental material to be used facilitates drawing up and storing of the dental material into the containment chambers 1202 or 1212. The containment chambers could also be integrated or attached to the handle 1201. The containment chambers may be made of any elastic or flexible material including, but not limited to, plastics, polymers, elastomers, rubber, nitrile, silicone, urethane, chloroprene, Ethylene Vinyl Acetate, or any combination thereof. Subsequent deformation of the containment chambers 1202 or 1212 encourages the dental material to travel back out through the material passages 1203 or 1213 to the applicator tips 1204 or 1214. The containment chambers 1202 and 1212 are also designed with, and manufactured from, materials that provide a chemically stable environment for the dental solution while it is stored in the containment chambers 1202 and 1212. These operations are intended to be performed independently for each side of the device 1200.

Applicator tips 1204 and 1214 may be comprised of an orientation of fibers (commonly referred to as flocking), affixed to the handle 1201 at the ends 1206 and 1207, which hold in suspension and help spread and distribute the dental solution to the work area. The applicator tips 1204 and 1214 may be used to apply dental solution directly to the teeth of a patient. The applicator tips 1204 and 1214 may be formed through known flocking methods, such as electrostatic flocking or gravity flocking. The applicator tips 1204 and 1214 could be the same size or could be different sizes.

In some embodiments, however, one or both of applicator tips 1204 and 1214 may comprise a plurality of bristles. The bristles may be made of or otherwise constitute reasonably soft fibers or filaments so as not to irritate target dental surfaces. Both natural and synthetic fibers or filaments may be used to form the bristles. Suitable natural fibers include, but are not limited to, cotton fibers, celluloses, gums, carbopolymers, water-dispersible polymers, and any combination thereof. Suitable synthetic fibers can include, but are not limited to, nylon, polyesters, polyamides, polyolefins, polypropylenes, polyvinylpyrrolidone, and any combination thereof. In addition, various injection moldable plastics may be formed as the bristles using standard injection molding techniques, without departing from the scope of the disclosure.

The diameter or size of the containment chambers 1202 and 1212 may vary, depending primarily on the configuration of the applicator tips 1204 and 1214, the size of the material passages 1203 and 1213, and the type of dental solution being applied with the applicator tips. For instance, a larger size material passage 1213 may be preferred and employed in order to convey higher viscosity dental solutions from containment chamber 1212. A larger material passage 1213 may also allow a dental solution to be applied at an increased flow rate. A larger material passage 1213, a larger containment chamber 1212, or a combination of both may be preferred when using a larger applicator tip 1214 or when a particular dental procedure requires a larger amount of dental solution.

At the same time, a smaller size material passage 1203 may be preferred and employed in order to convey lower viscosity dental solutions from containment chamber 1202. A smaller material passage 1203 may also allow a dental solution to be applied at a decreased flow rate. A smaller material passage 1203, a smaller containment chamber 1202, or a combination of both may be preferred when using a smaller applicator tip 1204 or when a particular dental procedure requires a small or precise amount of dental solution. As will be appreciated, each applicator tip 1204 and 1214 may be designed and otherwise manufactured to meet any desired size and application constraints. Exemplary sizes for the material passages 1203 and 1213 may range from about 15 gauge to about 25 gauge. In at least one embodiment, the size of the material passages 1203 and 1213 may range between about 18 gauge to about 20 gauge. Different identifying marks can be placed on each end of the device 1200 facilitating use of materials of differing viscosities or other properties by the user.

The double-sided multi dose dental application device 1200 could also be used with a two-part dental solution wherein each part is stored in containment chambers 1202 and 1212 respectively. The user would then apply each part from containment chambers 1202 and 1212 to the same work surface to combine the parts and activate the two-part dental solution.

The double-sided multi dose dental application device 1200 described herein can be readily adapted to include separate tip assemblies from the handle. In some embodiments, the tip assemblies may be coupled to the handle via circular protrusions and circular valleys, an interference fit, an adhesive or epoxy, through sonic welding techniques, or with a threaded connection without departing from the scope of the disclosure.

Figure 13:
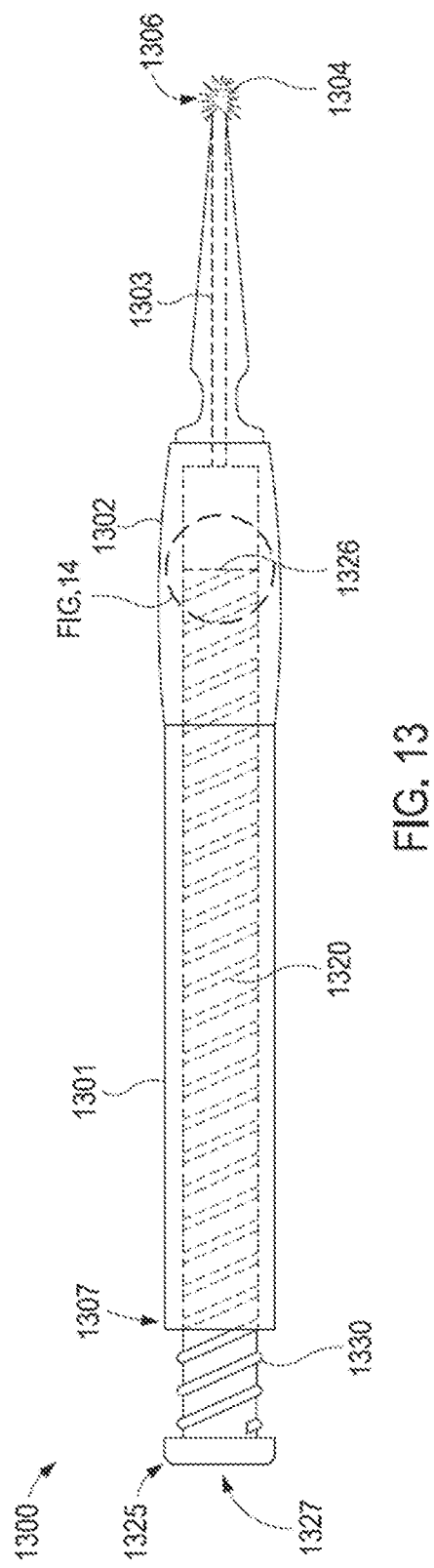
FIG. 13 is a side view of another embodiment of multi dose dental application device.

FIG. 13 is a side view of another embodiment of a multi dose dental application device 1300, according to one or more embodiments. This embodiment depicts a multi dose dental application device 1300 designed to draw in, contain, transport to the working area, and then dispense and apply an amount of dental solution greater than can be suspended in the applicator tip alone. A spring loaded plunger allows the user to depress a button on the back end of the handle. When released material is drawn into the applicator. One benefit of this design is to contain and provide enough dental solution to perform larger applications without the need for the user to return multiple times to the solution, thus saving time and allowing the user to stay focused on the task at hand. The spring assisted loading makes it easier for the operator to load the unit with the dental solution to be used.

As illustrated, the multi dose dental application device 1300 may include a generally elongated handle 1301 having a first end 1306 and a second end 1307. The multi dose dental application device 1300 may also have a containment chamber 1302 disposed within the handle 1301 for storing a dental solution. The handle 1301 may be made of plastic, such as polypropylene, but could equally be made of any other rigid, semi-rigid, or elastic material (e.g., a metal, a composite material, an elastomer, etc.), without departing from the scope of the disclosure. An applicator tip 1304 may be coupled to the handle 1301 at the first end 1306. A material passage 1303 connects the containment chamber 1302 to the applicator tip 1304 creating a path through which the dental solution can travel.

The handle 1301 is comprised of a hollow portion creating a containment chamber 1302 wherein the dental solution is contained. The handle 1301 further comprises a through hole 1308 connected between the containment chamber 1302 and the second end 1307. A plunger 1320 is receivably coupled to the handle 1301 via the through hole 1308. The plunger 1320 has a first end 1326 and a second end 1327. The second end 1327 of the plunger 1320 protrudes from the handle 1301 acting as a button 1325. The first end 1326 of the plunger 1320 contains a seal 1322 to effectively seal against the inside of the containment chamber 1302 creating a seal in order to maximize suction and draw of dental solution.

Figure 14:
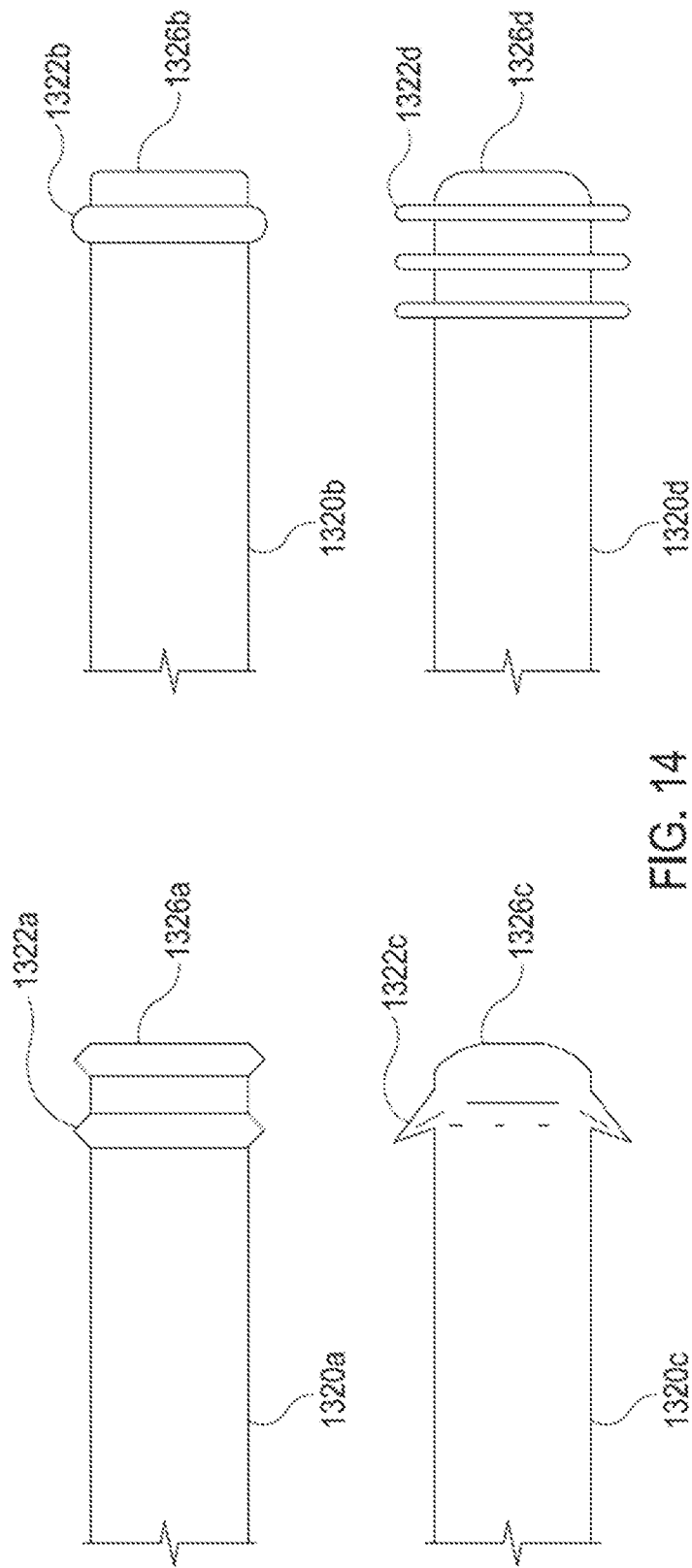
FIG. 14 is an enlarged view of view A from FIG. 6 and illustrates alternate embodiments for the plunger seal.

FIG. 14 illustrates exemplary embodiments of various seals 1322 that can be implemented on plunger 1320. Seals 1322 may comprise ribs 1322a, o-rings 1322b, a one-way plunger 1322c, wipers 1322d, contact rings (not shown), or any other geometry designed to create a seal against containment chamber 1302.

A spring 1330 applies an opposing force between the second end 1307 of handle 1301 and the button 1325 of the plunger 1320, effectively holding the device in the "drawn" position, until which time the user depresses the button 1325 of the plunger 1320, compressing the spring 1330 and preparing the device to draw in dental solution.

The containment chamber 1302 is designed from materials allowing enough flexibility to act as a "bulb," wherein deforming the containment chamber 1302 encourages the dental material to travel through the material passage 1303 to the applicator tip 1304. The containment chamber 1302 is also designed with, and manufactured from, materials that provide a chemically stable environment for the dental solution while it is stored in the containment chamber 1302. The containment chamber 1302 could also be integrated or attached to the handle 1301. The containment chamber 1302 may be made of any elastic or flexible material including, but not limited to, plastics, polymers, elastomers, rubber, nitrile, silicone, urethane, chloroprene, Ethylene Vinyl Acetate, or any combination thereof.

Applicator tip 1304 may be comprised of an orientation of fibers (commonly referred to as flocking), affixed to the handle 1301 at the first end 1306, which hold in suspension and help spread and distribute the dental solution to the work area. The applicator tip 1304 may be used to apply dental solution directly to the teeth of a patient. The applicator tip 1304 may be formed through known flocking methods, such as electrostatic flocking or gravity flocking.

In some embodiments, however, the applicator tip 1304 may comprise a plurality of bristles. The bristles may be made of or otherwise constitute reasonably soft fibers or filaments so as not to irritate target dental surfaces. Both natural and synthetic fibers or filaments may be used to form the bristles. Suitable natural fibers include, but are not limited to, cotton fibers, celluloses, gums, carbopolymers, water-dispersible polymers, and any combination thereof. Suitable synthetic fibers can include, but are not limited to, nylon, polyesters, polyamides, polyolefins, polypropylenes, polyvinylpyrrolidone, and any combination thereof. In addition, various injection moldable plastics may be formed as the bristles using standard injection molding techniques, without departing from the scope of the disclosure.

As illustrated in FIG. 15, the multi dose dental application device 1300 operates similar to a syringe, with the exception of being spring loaded to assist in semi-automatically drawing in dental solution. To operate, the user depresses the button 1325 of plunger 1320 located at the rearmost end of the handle (displacing the air contained within) then submerges the first end 1306 of the handle in the dental solution desired to be used. With the first end 1306 submerged in the dental solution the user then releases the button 1325 of plunger 1320, the result of which creates a suction action which draws dental solution up and into the containment chamber 1302 of the applicator 1300. The user then transports the device to the work area. Once in the area where the dental solution is to be applied, the user deforms the containment chamber 1302, or depresses the button 1325 of plunger 1320, forcing the dental solution to travel from the containment chamber 1302 through to, and out of, first end 1306 where it is then held in suspension by applicator tip 1304 and then applied to the desired work area.

Unit Dose Applicator with Containment Chamber

As will now be described, an alternate embodiment to the unit dose applicator described above provides for a dental application device designed to contain, dispense, and apply a predetermined amount of dental solution. The present disclosure details a method of construction, containment and activation method for accessing the solution contained within. The cannula not only acts as a passage to transmit the dental solution, but also acts as the piercing device and method for accessing the dental solution, thus "activating" the dental application device and allowing the contained dental solution to be dispensed. The dental application device is intended as a single use device, commonly referred to as a "unit dose."

Referring to FIG. 16, illustrated is a side view of an exemplary unit dose dental application device 2100, according to one or more embodiments of the present disclosure. As discussed herein, the unit dose dental application device 2100 may be particularly useful in containing, dispensing, and applying a dental solution. Dental solutions that may be used with the unit dose dental application device 2100 may be any flowable dental medicaments, sealants, bonding agents, etchants, cavity liners, or disclosing solutions that are commonly applied to teeth during dental cleaning, preparation, and restorative processes. Exemplary dental solutions that may be used in conjunction with the unit dose dental application device 2100 include, but are not limited to, fluoride varnish, flowable composites, whitening solutions and gels, cements, adhesives, bonding agents, desensitizers, and etchants.

As illustrated, the unit dose dental application device 2100 may include a generally elongated handle 2101 having a first end 2106 and a second end 2107. The unit dose dental application device 2100 may also have a containment chamber 2102 disposed within the handle 2101 for storing a dental solution. The handle 2101 may be made of plastic, such as polypropylene, but could equally be made of any other rigid, semi-rigid, or elastic material (e.g., a metal, a composite material, an elastomer, etc.), without departing from the scope of the disclosure. A receiver tip 2110 may be coupled to the handle 2101 at the first end 2106. The receiver tip 2110 includes a material passage 2103 that forms a conduit between the first end 2106 and a receiving end 2108 that can receive a piercing cannula 2124. A chamber divider 2102a separates the containment chamber 2102 from the material passage 2103 and forms a fractionable seal that separates the dental solution from the atmosphere. An end cap 2109 may be coupled to the handle 2101 at the second end 2107 to seal the containment chamber 2102 and separates the dental solution from the atmosphere, providing a stable environment for the storage of said solution.

Piercing cannula 2124 is a hollow tube that connects internally to, and is moveable within, the material passage 2103. The piercing cannula 2124 includes a piercing end 2123 and an applicator tip 2125. The piercing cannula 2124 is designed to move through and pierce or puncture the chamber divider 2102a, allowing the dental material to travel through the cannula 2124 and material passage 2103, out to the applicator tip 2125.

Piercing cannula 2124 also includes a cannula stop 2124a located on the outside diameter of the piercing cannula. The cannula stop 2124a is designed to stop or impede the cannula from traveling too far into the material passage and prevent the applicator tip 2125 from contacting the receiving end 2108. The cannula stop 2124a also helps maintain the piercing cannula 2124 in a stable position when the unit dose dental application device 2100 is in use.

The containment chamber 2102 is located within the handle 2101. The primary function of the containment chamber 2102 is to provide a stable environment for the dental solution contained within. The containment chamber consists of a hollowed portion of the handle 2101. The containment chamber 2102 is designed with, and manufactured from, materials that provide a chemically stable environment for the dental solution until which time the chamber divider 2102a is acted upon, exposing the dental solution to the atmosphere and ultimately its intended use. The containment chamber 2102 can also acts as a "bulb," wherein squeezing the containment chamber 2102 encourages the dental solution to travel through the piercing cannula 2124 and material passage 2103 to the applicator tip 2125.

Applicator tip 2125 may be comprised of an orientation of fibers (commonly referred to as flocking), affixed to the piercing cannula 2124, which hold in suspension and help spread and distribute the dental solution to the work area. The applicator tip 2125 may be used to apply dental solution directly to the teeth of a patient. The applicator tip 2125 may be formed through known flocking methods, such as electrostatic flocking or gravity flocking.

In some embodiments, however, the applicator tip 2125 may comprise a plurality of bristles. The bristles may be made of or otherwise constitute reasonably soft fibers or filaments so as not to irritate target dental surfaces. Both natural and synthetic fibers or filaments may be used to form the bristles. Suitable natural fibers include, but are not limited to, cotton fibers, celluloses, gums, carbopolymers, water-dispersible polymers, and any combination thereof. Suitable synthetic fibers can include, but are not limited to, nylon, polyesters, polyamides, polyolefins, polypropylenes, polyvinylpyrrolidone, and any combination thereof. In addition, various injection moldable plastics may be formed as the bristles using standard injection molding techniques, without departing from the scope of the disclosure.

The end cap 2109 seals the containment chamber 2102 and separates the dental solution from the atmosphere, providing a stable environment for the storage of said solution. The end cap 2109 may be coupled to the handle 2101 during manufacturing, after the containment chamber has been filled with dental solution. The end cap 2109 can be coupled in any know manner such as through use of applied adhesives, ultrasonic or spin welding, heat sealing, etc., any of which may or may not be combined with mechanical means of fastening such as snap or mating features, thread, press fitting, etc.

Referring now to FIG. 17, with continued reference to FIG. 16, illustrated is a side view of an exemplary embodiment of the unit dose dental application device 2100, according to one or more embodiments. As illustrated, the material passage 2103 extends within the receiver tip 2110 between the first end 2106 and a receiving end 2108 that can receive a piercing cannula 2124. The chamber divider 2102a forms a fractionable seal that separates the containment chamber 2102 from the material passage 2103. The chamber divider 2102a separates the dental solution from the atmosphere and the applicator tip 2125. Acting on, activating, or in some manner removing the chamber divider 2102a, opens the passage 2103 and thereby places the containment chamber 2102 in fluid communication with the applicator tip 2125 during operation.

In an exemplary embodiment, the user "activates" the device and gains access to the dental solution contained within the containment chamber 2102 by forcing the piercing cannula 2124 inwardly through the material passage 2103. The piercing end 2123 of the piercing cannula 2124 makes contact with and pierces the chamber divider 2102a located between the material passage 2103 and the containment chamber 2102 wherein the dental solution is contained. Once pierced, the dental solution can flow from the containment chamber 2102 through the material passage 2103 and piercing cannula 2124 through to, and out of, the applicator tip 2125 to the desired work area. Squeezing the containment chamber 2102 aids in the travel of dental material to the applicator tip 2125 where it is then held in suspension. The user may then apply the dental solution to the teeth of a patient as part of routine dental cleaning, preparation, and restorative procedures. The user may again apply pressure to the containment chamber 2102 to supply additional dental solution to applicator tip 2125 once more dental solution is needed, thereby reducing interruptions during the dental procedure adding convenience for the user. In addition, by varying the pressure applied to the containment chamber 2102, the user may precisely control the amount of dental solution supplied to the applicator tip 2125.

Figure 18:
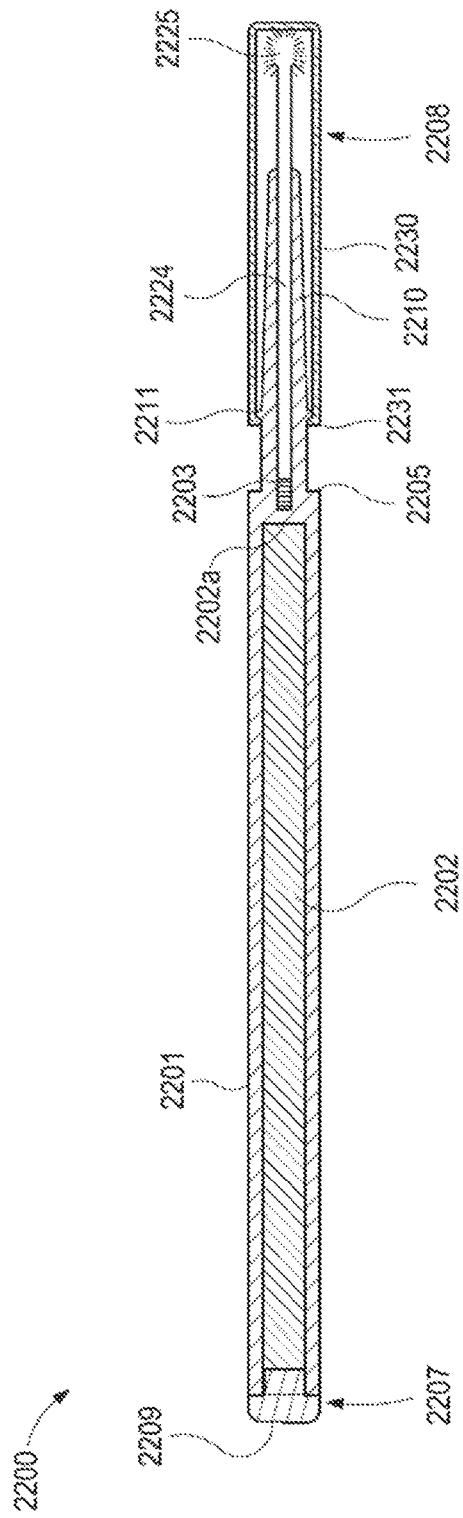
FIG. 18 is a cross-sectional side view of another alternate exemplary unit dose dental application device having an end cap.

FIG. 18 is a side view of another embodiment of a unit dose dental application device 2200, according to one or more embodiments. This embodiment depicts a unit dose dental application device 2200 designed to contain, then dispense and apply a predetermined amount of solution. The device is intended as a single use device, commonly referred to as a "unit dose." The unit dose dental application device 2200 is comprised of a handle 2201, containment chamber 2202, chamber divider 2202a, material passage 2203, piercing cannula 2224, receiver tip 2210, activating cap 2230, applicator tip 2225, and an end cap 2209.

The activating cap 2230 is a cap that fits over the receiver tip 2210 and piercing cannula 2224 of the unit dose dental application device 2200. The activating cap 2230 is designed to have two positions: an at rest position and an activated position. In the at rest position, the activating cap 2230 is coupled to the receiver tip 2210 via circular protrusion 2211 that is designed to matingly couple with circular protrusion 2231 on the activating cap 2230. The activating cap 2230 also acts as a protective barrier to prevent the applicator tip 2225 from being exposed to the atmosphere. The unit dose dental application device 2200 is provided to the user with the activating cap 2230 in the at rest position.

The piercing cannula 2224 includes a piercing end 2223 and an applicator tip 2225. When the activating cap 2230 is pushed toward the handle 2201, it engages with the piercing cannula 2224 at the applicator tip 2225 causing it to move within the material passage 2203 toward the chamber divider 2202a. The piercing cannula 2224 is designed to move through and pierce or puncture the chamber divider 2202a, allowing the dental material to travel through the cannula 2224 and material passage 2203, out to the applicator tip 2225.

Figure 19:
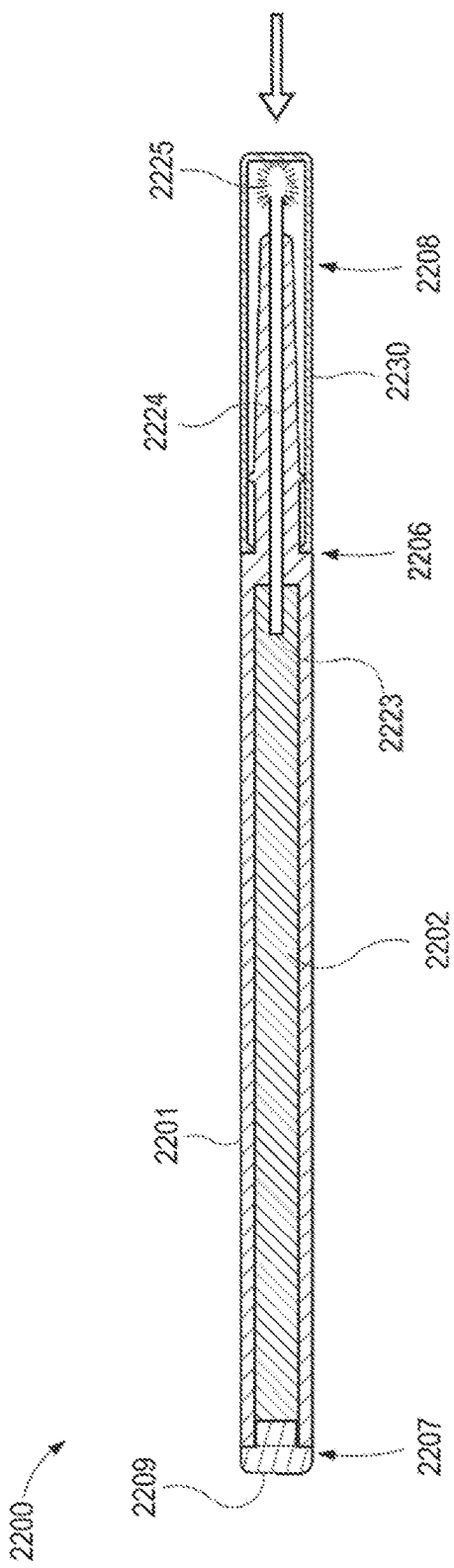
FIG. 19 is a cross-sectional side view of another alternate exemplary unit dose dental application device having an end cap that is activated.

FIG. 19 is a side view of unit dose dental application device 2200 with the activating cap 2230 in the activated position. Handle 2201 includes an activating cap stop 2205 located at the first end 2206. The activating cap stop 2205 is designed to stop or impede the activating cap 2230 from pushing the piercing cannula 2224 too far into the material passage and prevent the applicator tip 2225 from contacting the receiving end 2208. The interaction of the activating cap 2230 and the activating cap stop 2205, specifically when engaged in the "activated position" is designed so that the activating cap 2230 has enough travel to force the piercing cannula 2224 to travel far enough to pierce the chamber divider 2202a and then effectively "bottom out," ceasing to travel further than necessary to perform that function. The activating cap 2230 is in the activated position once the activating cap 2230 has traveled enough to force the piercing cannula 2224 to pierce the chamber divider 2202a.

In an exemplary embodiment, the user "activates" the device and gains access to the dental solution contained within the containment chamber 2202 by pushing the activating cap 2230 toward the activating cap stop 2205 of the handle 2201 until the activating cap bottoms out against the activating cap stop 2205. This action forces the piercing cannula 2224 inward to the device through the material passage 2203. The piercing end 2223 of the piercing cannula 2224 makes contact with and pierces the chamber divider 2202a located between the material passage 2203 and the containment chamber 2202 wherein the dental solution is contained. Once pierced, the dental solution can flow from the containment chamber 2202 through the material passage 2203 and piercing cannula 2224 through to, and out of, the applicator tip 2225 to the desired work area. Squeezing the containment chamber 2202 aids in the travel of dental material to the applicator tip 2225 where it is then held in suspension. The user may then apply the dental solution to the teeth of a patient as part of routine dental cleaning, preparation, and restorative procedures. The user may again apply pressure to the containment chamber 2202 to supply additional dental solution to applicator tip 2225 once more dental solution is needed, thereby reducing interruptions during the dental procedure adding convenience for the user. In addition, by varying the pressure applied to the containment chamber 2202, the user may precisely control the amount of dental solution supplied to the applicator tip 2225.

Figure 20:
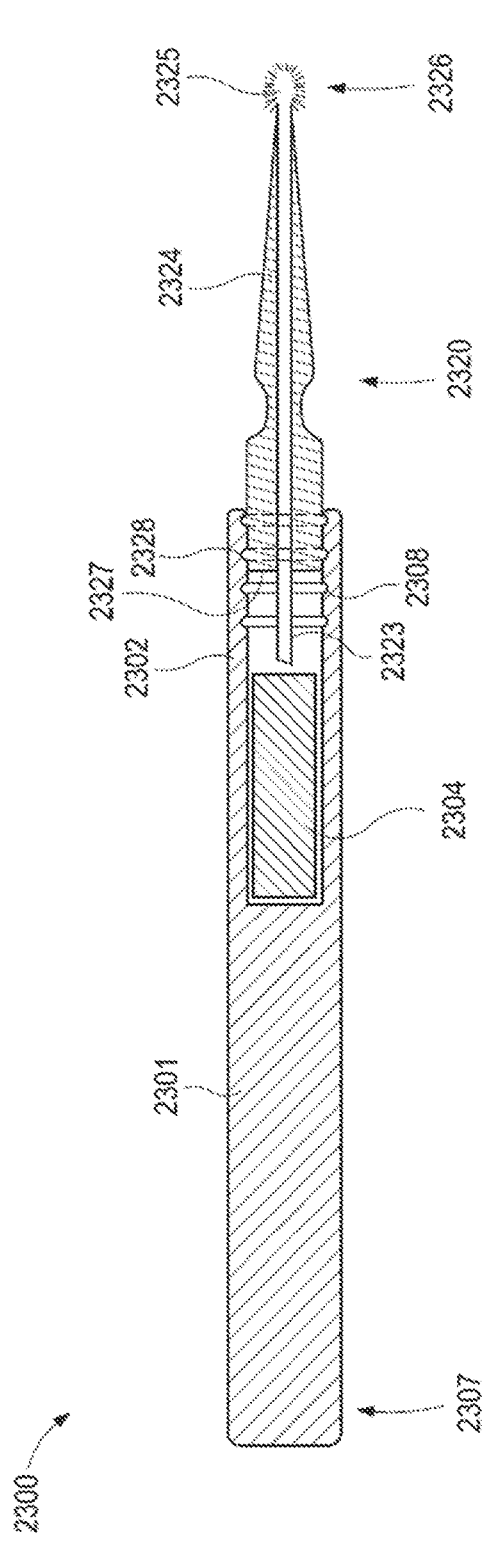
FIG. 20 is a cross-sectional side view of an alternate exemplary unit dose dental application device having an ampule.

FIG. 20 is a side view of another embodiment of a two-piece unit dose dental application device 2300, according to one or more embodiments. This embodiment depicts a unit dose dental application device 2300 designed to contain, then dispense and apply a predetermined amount of solution. The device is intended as a single use device, commonly referred to as a "unit dose." The two-piece unit dose dental application device 2300 combines a handle portion 2301 with a separate tip assembly 2320. The handle portion 2301 forms the main body of the device. The handle connects with the tip assembly 2320 to form the overall outside shape of the two-piece unit dose dental application device 2300. When the user pushes the handle portion 2301 together with the tip assembly 2320, the user forces the piercing mandrel 2323 to make contact with and pierce an ampoule 2304 held within containment chamber 2302. Once pierced, the dental solution can flow from the ampoule 2304 through the piercing mandrel 2323 and the material passage 2324 through to, and out of, the applicator tip 2325 of the two-piece unit dose dental application device 2300 to the desired work area. Squeezing the containment chamber 2302 aids in the travel of material to the applicator tip 2325.

As illustrated, two-piece unit dose dental application device 2300 may include a generally elongated handle 2301 having a first end 2306 and a second end 2307. The unit dose dental application device 2300 may also have a containment chamber 2302 disposed within the handle 2301 for receiving an ampule 2304. The ampule 2304 provides a stable environment for the dental solution contained within. The ampule 2304 is designed with, and manufactured from, materials that provide a chemically stable environment for the dental solution until which time the ampule 2304 is acted upon, exposing the dental solution to the atmosphere and ultimately its intended use. The ampule 2304 can also acts as a "bulb," wherein squeezing the containment chamber 2302 applies pressure to ampule 2304 and encourages the dental solution to travel through the piercing mandrel 2323 and the material passage 2324 to the applicator tip 2325.

The handle 2301 may be made of plastic, such as polypropylene, but could equally be made of any other rigid, semi-rigid, or elastic material (e.g., a metal, a composite material, an elastomer, etc.), without departing from the scope of the disclosure. The tip assembly 2320 has a first end 2326 and a second end 2327. The tip assembly 2320 also includes circular protrusions 2328 at second end 2327 that are designed to matingly couple with circular valleys 2308 at first end 2306. The tip assembly 2320 may be coupled to the handle 2301 at first end 2306 and second end 2327 via circular protrusions 2328 and circular valleys 2308.

The tips assembly 2320 together with the handle 2301 forms the main body of the device 2300. The tip assembly is comprised of a molded plastic tip with a through hole that forms the material passage 2324. Coupled to the material passage is the piercing mandrel 2323. The back end of the tip assembly is designed to fit into the handle 2301 at first end 2306.

Figure 21:
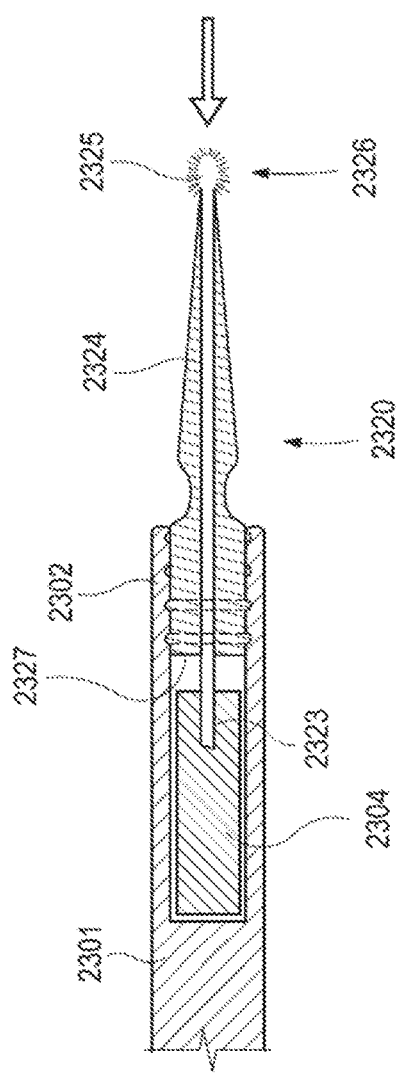
FIG. 21 is a partial cross-sectional side view of an alternate exemplary unit dose dental application device having an ampule that is activated.

FIG. 21 is a detail view of tip assembly 2320 after ampule 2304 has been pierced by piercing mandrel 2323. As illustrated, the containment chamber 2302 is created when the handle 2301 and tip assembly 2320 are telescopingly slid within each other, which creates a containment chamber 2302 which contains the ampoule 2304. The assembled pieces would contain inner geometry that would create a positive "stop" feature (circular protrusions 2328) when the handle 2301 and tip assembly 2320 are assembled in the "pre-activation" position. When ready to use, the user pushes the handle 2301 and tip assembly 2320 together, overcoming the stop feature (circular protrusions 2328), which compresses the chamber forcing the piercing mandrel 2323 into the ampoule 2304 thereby "activating" the applicator 2300 for use. The secondary function of the containment chamber is that, after activation or piercing of the inner ampoule, squeezing the containment chamber 2302 aids in encouraging the dental material to travel through the material passage 2324 to the distal end of the applicator.

In some embodiments, tip assembly 2320 may be coupled to the handle 2301 using an interference fit between the outer radial surface of the first end 2327 and the inner radial surface of the second end 2306. In other embodiments, the tip assembly 2320 may be secured to the handle 2301 using a threaded connection without departing from the scope of the disclosure.

The diameter or size of the containment chamber 2302 and ampule 2304 may vary, depending primarily on the configuration of the tip assembly 2320 (e.g., the size of the material passage 2323) and the type of dental solution being applied with the applicator tip 2325. For instance, a larger size material passage 2323 may be preferred and employed in order to convey higher viscosity dental solutions. A larger material passage 2323 may also allow a dental solution to be applied at an increased flow rate. A larger material passage 2323, a larger containment chamber 2302, a larger ampule 2304, or any combination of each may be preferred when using a larger applicator tip 2325 or when a particular dental procedure requires a larger amount of dental solution. As will be appreciated, the tip assembly 2320 may be designed and otherwise manufactured to meet any desired size and application constraints. Exemplary sizes for the material passage 2323 may range from about 15 gauge to about 25 gauge. In at least one embodiment, the size of the material passage 2323 may range between about 18 gauge to about 20 gauge.

Figure 22:
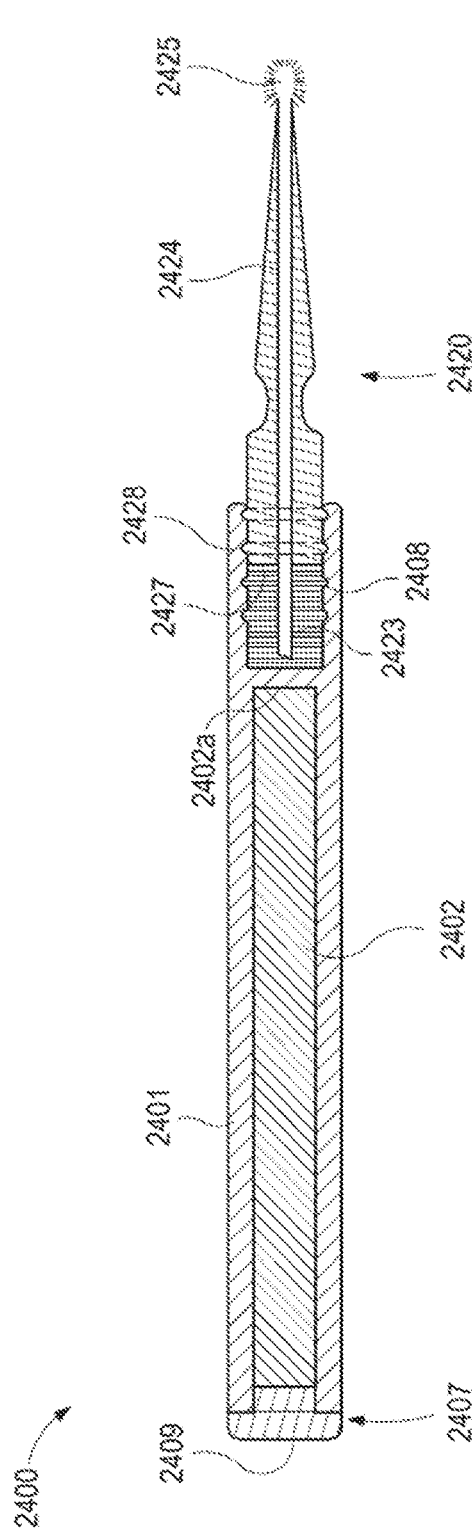
FIG. 22 is a cross-sectional side view of an alternate exemplary unit dose dental application device.

FIG. 22 is a side view of another embodiment of a two-piece unit dose dental application device 2400, according to one or more embodiments. This embodiment depicts a unit dose dental application device 2400 designed to contain, then dispense and apply a predetermined amount of solution. The device is intended as a single use device, commonly referred to as a "unit dose." The two-piece unit dose dental application device 2400 combines a handle portion 2401 with a separate tip assembly 2420. The handle portion 2401 forms the main body of the device. The two-piece unit dose dental application device 2400 may also have a containment chamber 2402 disposed within the handle 2401 for storing a dental solution. The handle 2401 connects with the tip assembly 2420 to form the overall outside shape of the two-piece unit dose dental application device 2400. When the user pushes the handle portion 2401 together with the tip assembly 2420, the user forces a piercing mandrel 2423 to make contact with and pierce a chamber divider 2402a that separates the containment chamber 2402 from the atmosphere. Once pierced, the dental solution can flow from the containment chamber 2402 through the piercing mandrel 2423 and a material passage 2424 through to, and out of, an applicator tip 2425 of the two-piece unit dose dental application device 2400 to the desired work area. Squeezing the containment chamber 2402 aids in the travel of dental material to the applicator tip 2425.

The chamber divider 2402a separates the containment chamber 2402 from the piercing mandrel 2423 and forms a fractionable seal that separates the dental solution from the atmosphere. The piercing mandrel 2423 is a hollow tube which connects internally to the material passage 2424. The piercing mandrel 2423 is designed to pierce or puncture the chamber divider 2402a, allowing the material to travel through the mandrel and material passage, out to the applicator tip 2425.

An end cap 2409 may be coupled to the handle 2401 at the second end 2407 to seal the containment chamber 2402 and separate the dental solution from the atmosphere, providing a stable environment for the storage of said solution. The end cap 2409 may be coupled to the handle 2401 during manufacturing, after the containment chamber has been filled with dental solution. The end cap 2409 can be coupled in any know manner such as through use of applied adhesives, ultrasonic or spin welding, heat sealing, etc., any of which may or may not be combined with mechanical means of fastening such as snap or mating features, thread, press fitting, etc.

The material passage 2424 connects with the piercing mandrel 2423 creating a complete passage from the pierced containment chamber 2402, through the mandrel 2423 and material passage 2424, out to the applicator tip 2425 of the device for the dental materials to travel.

The applicator tip 2425 is compiled of an orientation of fibers (commonly referred to as flocking), affixed to the end of the tip assembly, which hold in suspension, and help spread and distribute the dental material to the work area.

Figure 23:
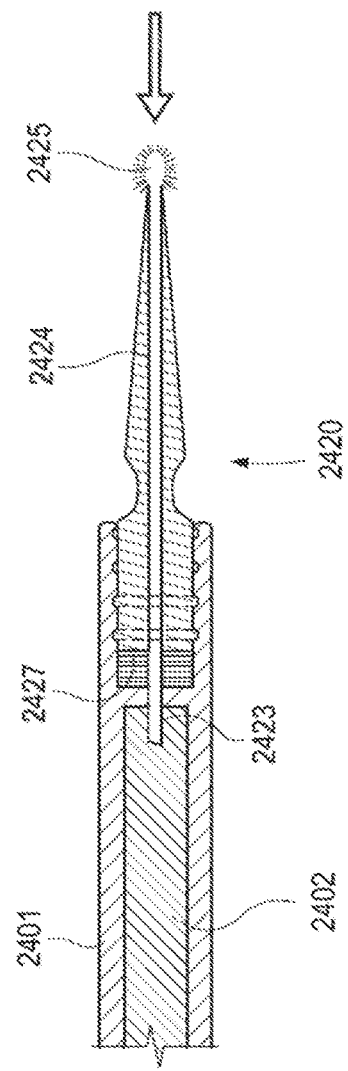
FIG. 23 is a partial cross-sectional side view of an alternate exemplary unit dose dental application device that is activated.

FIG. 23 is a detail view of tip assembly 2420 after containment chamber 2402 has been pierced by piercing mandrel 2423. As illustrated, the containment chamber 2402 is located in the handle 2401 and consists of a hollowed portion of the handle itself. The assembled pieces would contain inner geometry that would create a positive "stop" feature (circular protrusions 2428) when the handle 2401 and tip assembly 2420 are assembled in the "pre-activation" position. When ready to use, the user pushes the handle 2401 and tip assembly 2420 together, overcoming the stop feature (circular protrusions 2428), which forces the piercing mandrel 2423 into the chamber divider 2402a of containment chamber 2402 thereby "activating" the applicator 2400 for use. The secondary function of the containment chamber 2402 is that, after activation or piercing of the chamber divider 2402a, squeezing the containment chamber 2402 aids in encouraging the dental material to travel through the material passage 2424 to the applicator tip 2425.

Figure 24:
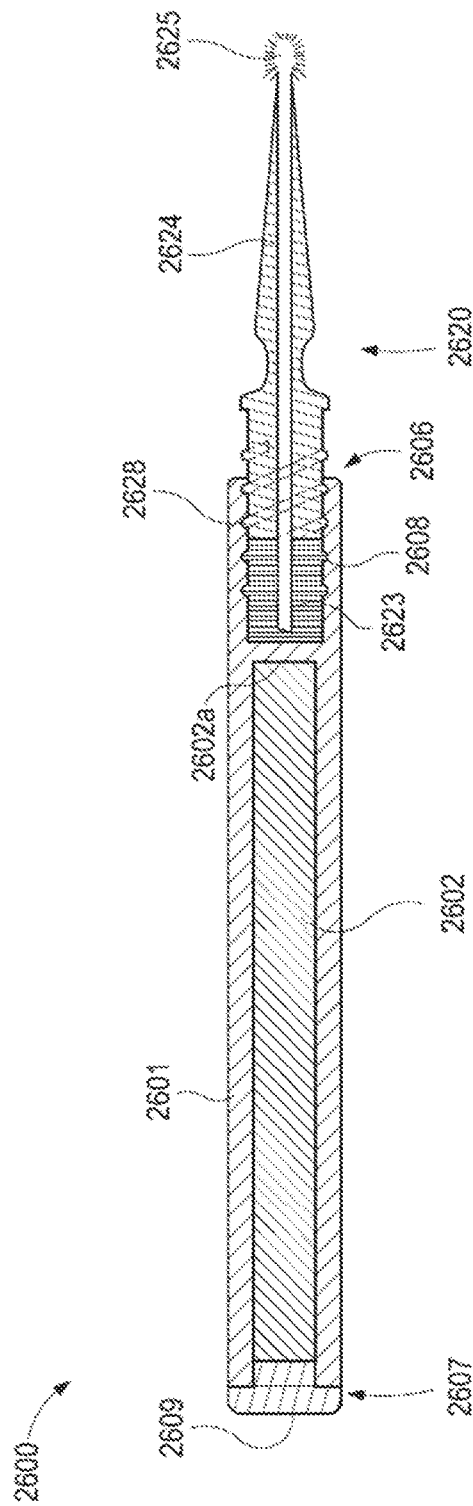
FIG. 24 is a partial cross-sectional side view of an alternate exemplary unit dose dental application device with a threaded connection.
Figure 25:
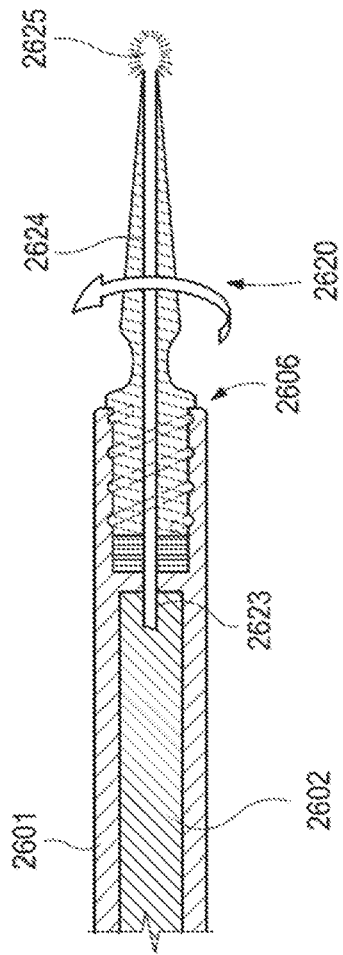
FIG. 25 is a partial cross-sectional side view of an alternate exemplary unit dose dental application device that with a threaded connection is activated.

The stop feature would be comprised of one or more ribs, circular protrusions, or otherwise engaging/mating features 2428 that when interacting with circular valleys 2408 form a tactile "stop" or snap together feature. This feature would be designed such that when the user intends to "activate" the device, a reasonable amount of effort when pushing the handle 2401 and tip assembly 2420 together would overcome this stop feature and allow the two pieces to move towards each other. Once circular protrusion 2428 reaches the next circular valley 2408, the user receives a tactile feedback and second "stop" position indicating that the device has been activated. The stop feature could also be embodied as threads 2608, shown in FIGS. 24 and 25, where by twisting or engaging the threads would draw the handle 2601 and tip assembly 2620 together, thus forcing the mandrel 2623 to enact on the containment chamber 2602, activating the device. In other embodiments, tip assembly 2620 may be coupled to the handle 2601 using an interference fit between the outer radial surface of the first end 2627 and the inner radial surface of the second end 2606 without departing from the scope of the disclosure.

In another embodiment, the unit dose dental application device can be designed to contain, then dispense and apply a predetermined amount of two solutions. Specifically the double-sided unit dose dental application device has a unit dose applicator on each side of the device, effectively doubling its capacity allowing the user to use two different dental solutions, or twice the amount of a chosen dental solution. The double-sided unit dose dental application device can be readily adapted to include separate tip assemblies from the handle 501. In some embodiments, the tip assemblies may be coupled to the handle via circular protrusions and circular valleys, an interference fit, an adhesive or epoxy, through sonic welding techniques, or with a threaded connection without departing from the scope of the disclosure.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A dental application device, comprising:
a handle having a first end, a second end, and a containment chamber disposed within the handle;
a dental solution disposed within the containment chamber;
a tip assembly having a piercing end, a stop, and an applicator tip;
a material passage disposed within the tip assembly that forms a conduit between the piercing end and the applicator tip;
a frangible seal that separates the containment chamber from the material passage;
wherein the piercing end protrudes from the distal end of the stop;
wherein the tip assembly is coupled to the first end of the handle, the piercing end punctures the frangible seal and fluidly connects the dental solution with the applicator tip; and
wherein the stop provides tactile feedback prior to the puncturing frangible seal by resisting the movement of the tip assembly relative to the handle.

2. The dental application device of claim 1, wherein the applicator tip is comprised of an orientation of fibers.

3. The dental application device of claim 1, wherein the stop is comprised of one or more mating features.

4. The dental application device of claim 1, wherein the material passage is coupled to a piercing mandrel.

5. The dental application device of claim 1, further comprising an activator cap coupled to a receiver tip.

* * * * *